(12) United States Patent
Shibata et al.

(10) Patent No.: US 11,953,742 B2
(45) Date of Patent: Apr. 9, 2024

(54) OPTICAL DEVICE AND OPTICAL SYSTEM

(71) Applicant: TDK CORPORATION, Tokyo (JP)

(72) Inventors: Tetsuya Shibata, Tokyo (JP); Hideaki Fukuzawa, Tokyo (JP); Tomohito Mizuno, Tokyo (JP); Masahiro Shinkai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/693,558

(22) Filed: Mar. 14, 2022

(65) Prior Publication Data

US 2022/0317397 A1   Oct. 6, 2022

(30) Foreign Application Priority Data

Mar. 30, 2021  (JP) ................................ 2021-056794
Dec. 20, 2021  (JP) ................................ 2021-206032

(51) Int. Cl.
*G02B 6/42*    (2006.01)
*G02B 6/43*    (2006.01)

(52) U.S. Cl.
CPC ......... *G02B 6/4296* (2013.01); *G02B 6/4274* (2013.01); *G02B 6/43* (2013.01)

(58) Field of Classification Search
CPC ....... G02B 6/4296; G02B 6/4274; G02B 6/43
USPC ........................................................ 385/31
See application file for complete search history.

(56) References Cited

U.S. PATENT DOCUMENTS

| | | | |
|---|---|---|---|
| 2003/0169981 A1* | 9/2003 | Nakanishi ............. | H01S 5/0232 385/92 |
| 2004/0047021 A1* | 3/2004 | Sakane ................ | G02B 6/4208 359/237 |

FOREIGN PATENT DOCUMENTS

JP   2018-180513 A   11/2018

OTHER PUBLICATIONS

Jun-Yang Chen et al., All-Optical Switching of Magnetic Tunnel Junctions with Single Subpicosecond Laser Pulses, Physical Review Applied 7, 021001 (2017).
English Translation of May 30, 2023 Office Action issued in Chinese Patent Application No. 202210309901.3.
English Translation of Aug. 25, 2023 Office Action issued in Chinese Patent Application No. 202210309901.3.

* cited by examiner

*Primary Examiner* — Jerry M Blevins
(74) *Attorney, Agent, or Firm* — Oliff PLC

(57) ABSTRACT

This optical device includes at least one magnetic element including a first ferromagnetic layer, a second ferromagnetic layer, and a spacer layer sandwiched between the first ferromagnetic layer and the second ferromagnetic layer, a laser diode, and a waveguide, in which the waveguide includes at least one input waveguide optically connected to the laser diode and an output waveguide connected to the input waveguide, and at least some of light propagating in at least one of the input waveguide and the output waveguide is applied to the magnetic element.

12 Claims, 22 Drawing Sheets

OPTICAL DEVICE AND OPTICAL SYSTEM

BACKGROUND

The present disclosure relates to an optical device and an optical system.

Priority is claimed on Japanese Patent Application No. 2021-056794, filed on Mar. 30, 2021, and Japanese Patent Application No. 2021-206032, filed on Dec. 20, 2021, the contents of which are incorporated herein by reference.

In recent years, attention has been focused on augmented reality (AR) glasses and small projectors, and attention is being paid to small planar lightwave circuits (PLCs) using laser diodes. Laser diodes are capable of drawing images with high energy efficiency.

For example, Patent Document 1 describes a light source with a monitoring function that can be used for a small projector. The light source with a monitoring function described in Patent Document 1 includes a detection element using a semiconductor photodiode (PD). The semiconductor photodiode monitors a light output. The light source with a monitoring function described in Patent Document 1 adjusts a white balance on the basis of a monitoring result of the light output.

Patent Document

[Patent Document 1] Japanese Unexamined Patent Application, First Publication No. 2018-180513

SUMMARY

A semiconductor photodiode manufactured as a separate member from a substrate on which a planar lightwave circuit is formed is large in size. New breakthroughs are required for further development of optical devices.

It is desirable to provide a novel optical device and optical system.

The following means are provided.

An optical device according to a first aspect includes at least one magnetic element including a first ferromagnetic layer, a second ferromagnetic layer, and a spacer layer sandwiched between the first ferromagnetic layer and the second ferromagnetic layer, a laser diode, and a waveguide, in which the waveguide includes at least one input waveguide optically connected to the laser diode and an output waveguide connected to the input waveguide, and at least some of light propagating in at least one of the input waveguide and the output waveguide is applied to the magnetic element.

An optical system according to a second aspect includes the optical device according to the above described aspect, and an optics system which guides light output from the optical device to an object to be irradiated.

DETAILED DESCRIPTION

Figure 1:
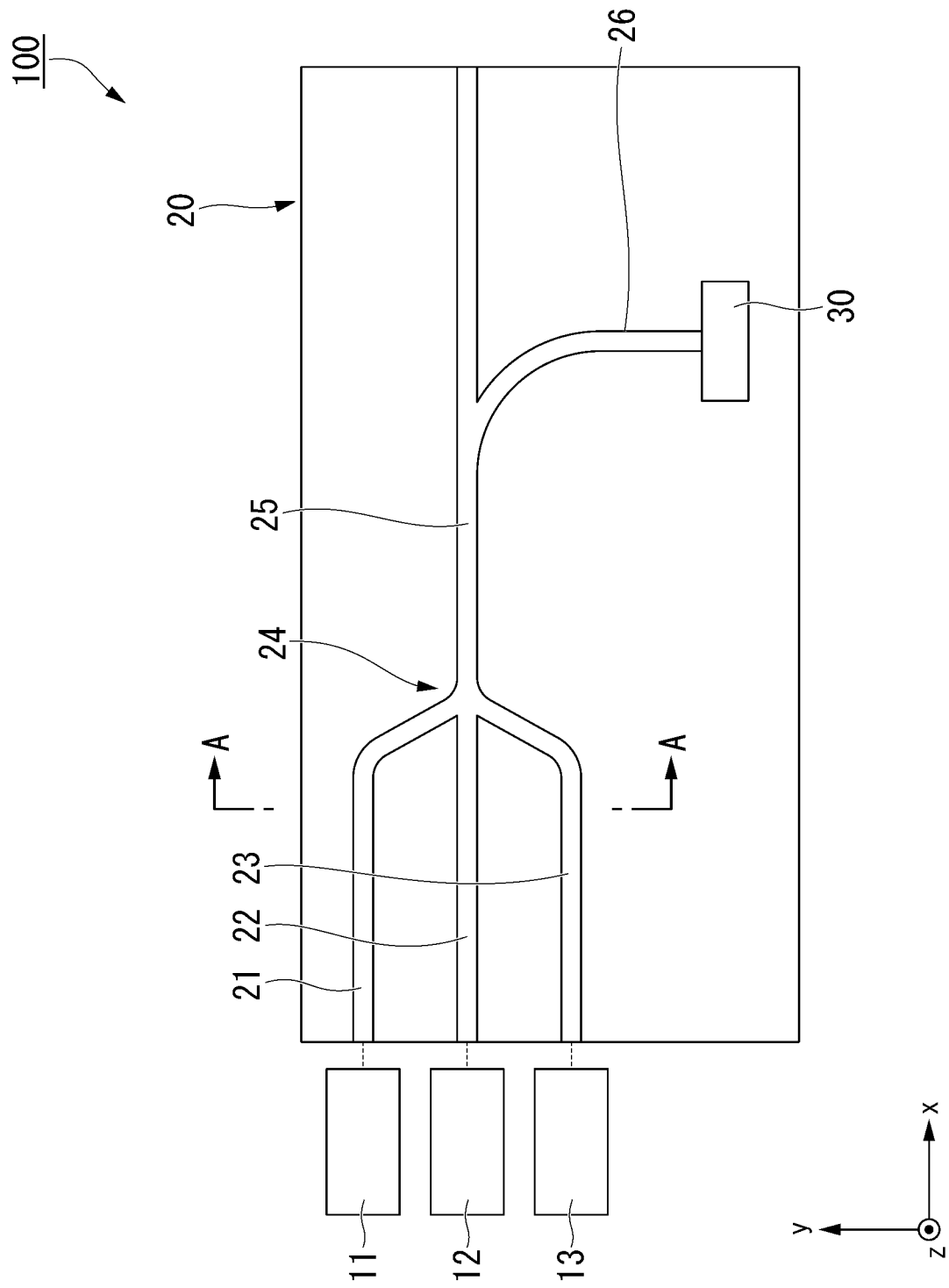
FIG. 1 is a plan view of an optical device according to a first embodiment.

Hereinafter, embodiments will be described in detail with reference to the drawings as appropriate. In the drawings used in the following description, there are cases in which characteristic portions are appropriately enlarged for convenience of illustration so that characteristics of the present embodiment can be easily understood, and dimensional proportions of respective constituent elements may be different from actual ones. Materials, dimensions, and the like illustrated in the following description are merely examples, and the present disclosure is not limited thereto and can be implemented with appropriate modifications within a range in which the effects of the present disclosure are achieved.

Directions will be defined. One direction in a plane on which a substrate 27 (see FIG. 2) extends is referred to as an x direction, and a direction in the plane perpendicular to the x direction is referred to as a y direction. A direction perpendicular to the substrate 27 (direction perpendicular to the x direction and the y direction) is referred to as a z direction. Hereinafter, a +z direction may be expressed as "upward" and a −z direction may be expressed as "downward." The "upward" and the "downward" may not necessarily have to coincide with a direction in which gravity is applied.

First Embodiment

FIG. 1 is a plan view of an optical device 100 according to a first embodiment. The optical device 100 includes a plurality of laser diodes 11, 12, and 13, a waveguide 20, and a magnetic element 30.

The laser diodes 11, 12, and 13 each output laser light. For example, the laser diode 11 is a red laser that outputs light in a wavelength region of 590 nm or more and 800 nm or less. For example, the laser diode 12 is a green laser that outputs light in a wavelength region of 490 nm or more and less than 590 nm. For example, the laser diode 13 is a blue laser that outputs light in a wavelength region of 380 nm or more and less than 490 nm. Hereinafter, a case of using lasers of three colors including red, green, and blue will be described as an example, but the number of laser diodes, a wavelength region to be output, or the like is not limited to the case.

The waveguide 20 includes, for example, input waveguides 21, 22, and 23, a combined waveguide 24, an output waveguide 25, and a monitoring waveguide 26.

The input waveguides 21, 22, and 23 are optically connected to the laser diodes 11, 12, and 13, respectively. For example, light output from the laser diode 11 propagate in the input waveguide 21. For example, light output from the laser diode 12 propagate in the input waveguide 22. For example, light output from the laser diode 13 propagate in the input waveguide 23.

The combined waveguide 24 is between the input waveguides 21, 22, and 23 and the output waveguide 25. Light propagating in each of the input waveguides 21, 22 and 23 is combined at the combined waveguide 24. The output waveguide 25 is connected to the combined waveguide 24. The output waveguide 25 is connected to the input waveguides 21, 22, and 23 via the combined waveguide 24, and the light from the input waveguides 21, 22, and 23 propagate in the output waveguide 25.

The monitoring waveguide 26 is connected to at least one of the input waveguides 21, 22, and 23 and the output waveguide 25. At least a part of light propagating in at least one of the input waveguides 21, 22, and 23 and the output waveguide 25 propagates in the monitoring waveguide 26. Hereinafter, at least a part of the light propagating in at least one of the input waveguides 21, 22, and 23 and the output waveguide 25 may be referred to as monitoring light. The monitoring waveguide 26 illustrated in FIG. 1 is connected to the output waveguide 25. The monitoring light is branched from the output waveguide 25 and propagate in the monitoring waveguide 26.

Figure 2:
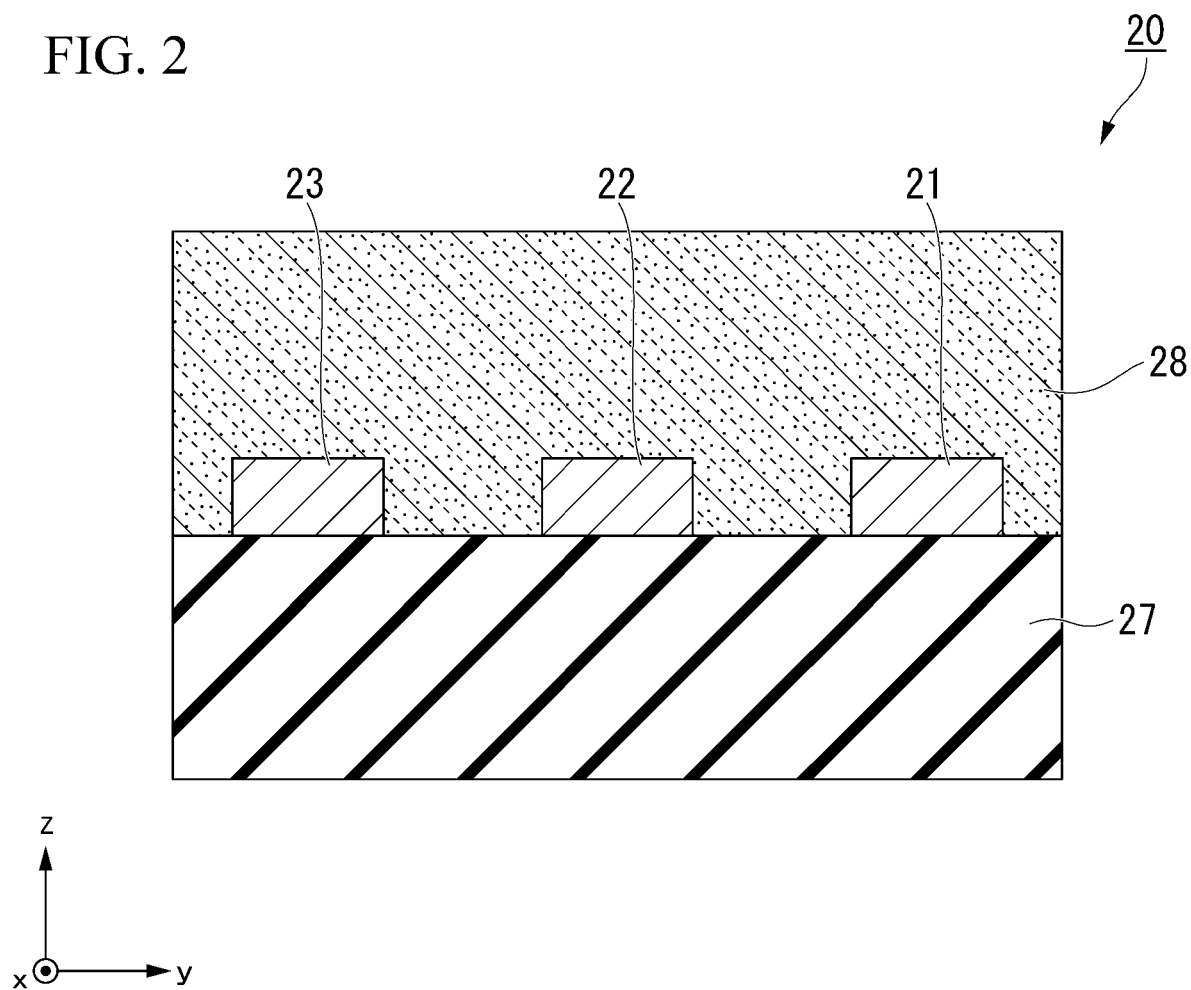
FIG. 2 is a cross-sectional view of a waveguide of the optical device according to the first embodiment.

FIG. 2 is a cross-sectional view of the waveguide 20 of the optical device according to the first embodiment. FIG. 2 is a cross section along line A-A of FIG. 1. FIG. 2 is a cross section of the input waveguides 21, 22, and 23 of the waveguide 20.

The input waveguides 21, 22, and 23 are on the substrate 27. The substrate 27 may contain, for example, aluminum oxide. The substrate 27 may be, for example, sapphire. The input waveguides 21, 22, and 23 protrudes in the z direction from the substrate 27. The input waveguides 21, 22, and 23 may contain, for example, lithium niobate as a main component. Some elements of the lithium niobate may be replaced with other elements. The input waveguides 21, 22 and 23 are each covered with, for example, a clad 28. The clad 28 may be, for example, $SiO_2$, $Al_2O_3$, $MgF_2$, $La_2O_3$, ZnO, $HfO_2$, MgO, $Y_2O_3$, $CaF_2$, $In_2O_3$, or the like, or a mixture thereof. Materials of the input waveguides 21, 22, and 23 and the clad 28 are not limited to this example. For example, a core constituting the input waveguides 21, 22, and 23 may be silicon or silicon oxide to which germanium oxide is added, and the clad may be silicon oxide. The combined waveguide 24 and the output waveguide 25 have the same configuration as the input waveguides 21, 22, and 23.

Figure 3:
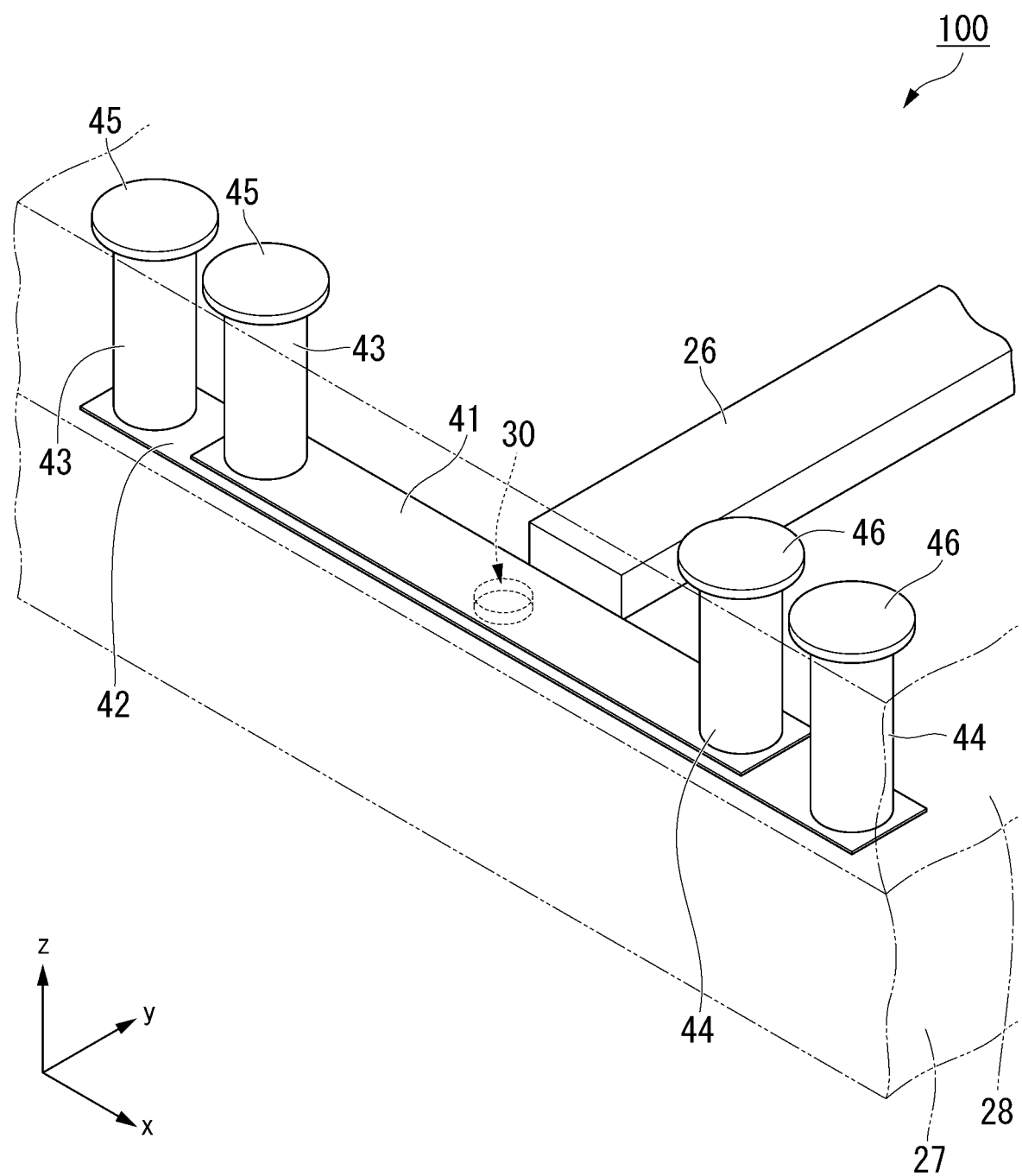
FIG. 3 is a perspective view in the vicinity of a magnetic element of the optical device according to the first embodiment.
Figure 4:
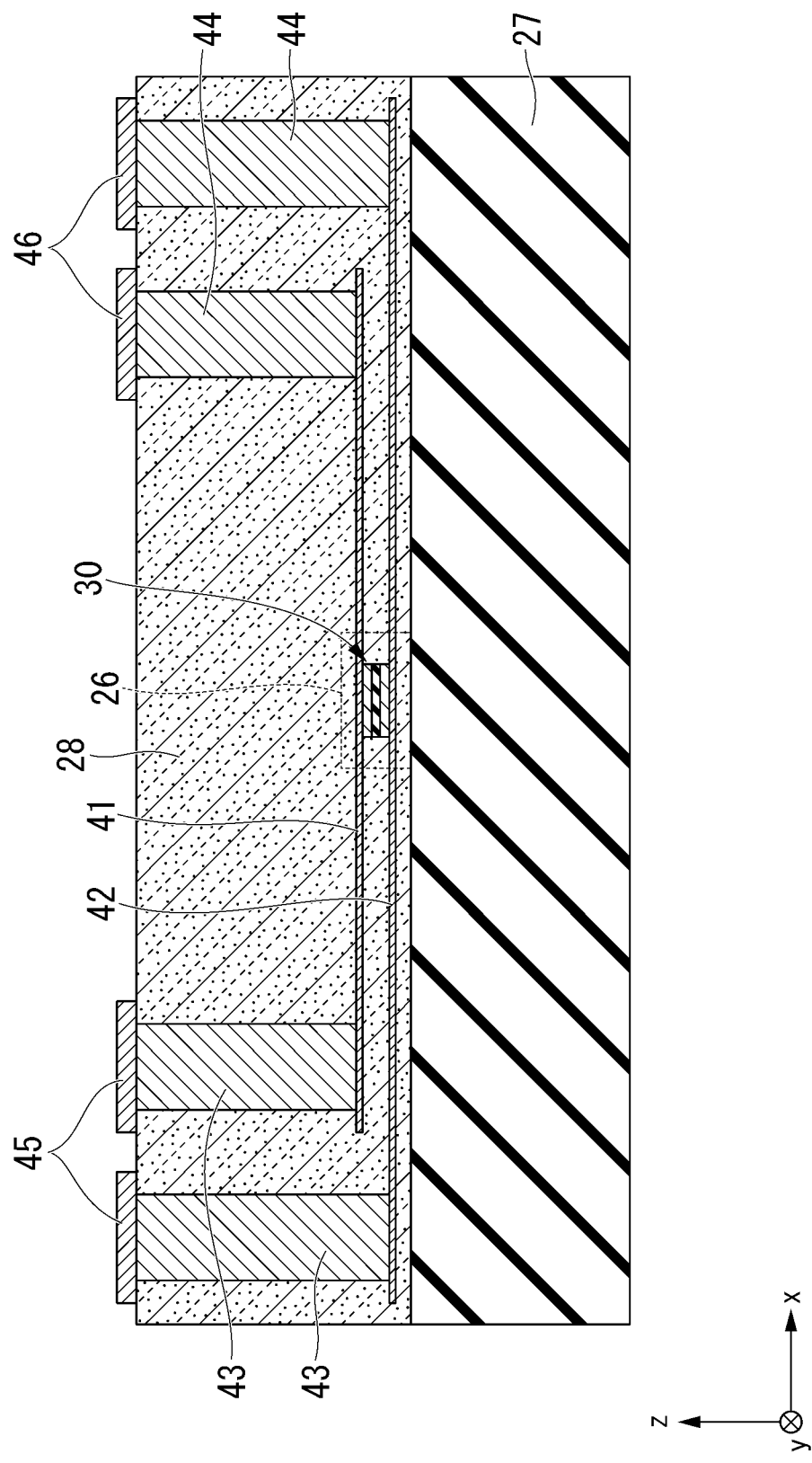
FIG. 4 is a cross-sectional view in the vicinity of the magnetic element of the optical device according to the first embodiment.

FIG. 3 is a perspective view in the vicinity of the magnetic element 30 of the optical device 100 according to the first embodiment. FIG. 4 is a cross-sectional view in the vicinity of the magnetic element 30 of the optical device 100 according to the first embodiment.

The magnetic element 30 is at a position irradiated with the monitoring light. The magnetic element 30 is, for example, on a front side of an output end of the monitoring waveguide 26. The monitoring light is applied to the magnetic element 30 from, for example, a direction intersecting a lamination direction of the magnetic element 30. The monitoring light is applied to, for example, a lateral surface of the magnetic element 30. The magnetic element 30 is formed on the same substrate as the substrate 27 on which the waveguide 20 is formed. That is, the magnetic element 30 and the waveguide 20 are incorporated in one article and are not separable. The magnetic element 30 is on the substrate 27 or above the substrate 27.

The magnetic element 30 is electrically connected to, for example, electrodes 41 and 42, via wirings 43 and 44, an input terminal 45, and an output terminal 46.

The electrode 41 is connected to a first surface of the magnetic element 30. The electrode 42 is connected to a second surface of the magnetic element 30. The first surface and the second surface face each other in the lamination direction of the magnetic element 30.

The electrodes 41 and 42 contain a material having conductivity. The electrodes 41 and 42 are formed of, for example, a metal such as Cu, Al, Au, or Ru. Ta or Ti may be laminated on upper and lower sides of these metals. Also, a laminated film of Cu and Ta, a laminated film of Ta, Cu, and Ti, and a laminated film of Ta, Cu, and TaN may be used for the electrodes 41 and 42. Also, TiN or TaN may be used for the electrodes 41 and 42.

The electrodes 41 and 42 may have transmittance with respect to a wavelength region of the light applied to the magnetic element 30. For example, the electrodes 41 and 42 may be transparent electrodes containing a transparent electrode material of an oxide such as indium tin oxide (ITO), indium zinc oxide (IZO), zinc oxide (ZnO), and indium gallium zinc oxide (IGZO). Also, the electrodes 41 and 42 may be configured to have a plurality of columnar metals in these transparent electrode materials.

The via wiring 43 connects the input terminal 45 to the electrode 41 or the electrode 42. There are, for example, two input terminals 45. A current or a voltage is input to one of the input terminals 45, and the other of the input terminals 45 is connected to a reference electric potential. The input terminal 45 is exposed, for example, on an upper surface of the clad 28. The via wiring 44 connects the output terminal 46 to the electrode 41 or the electrode 42. There are, for example, two output terminals 46. A signal is output from one of the output terminals 46, and the other of the output terminals 46 is connected to the reference electric potential. The output terminal 46 is exposed, for example, on the upper surface of the clad 28. The via wirings 43 and 44, the input terminals 45, and the output terminals 46 contain a material having conductivity. As materials of the via wirings 43 and 44, the input terminals 45, and the output terminals 46, the same materials as those taken as examples of the electrodes 41 and 42 can be used.

Figure 5:
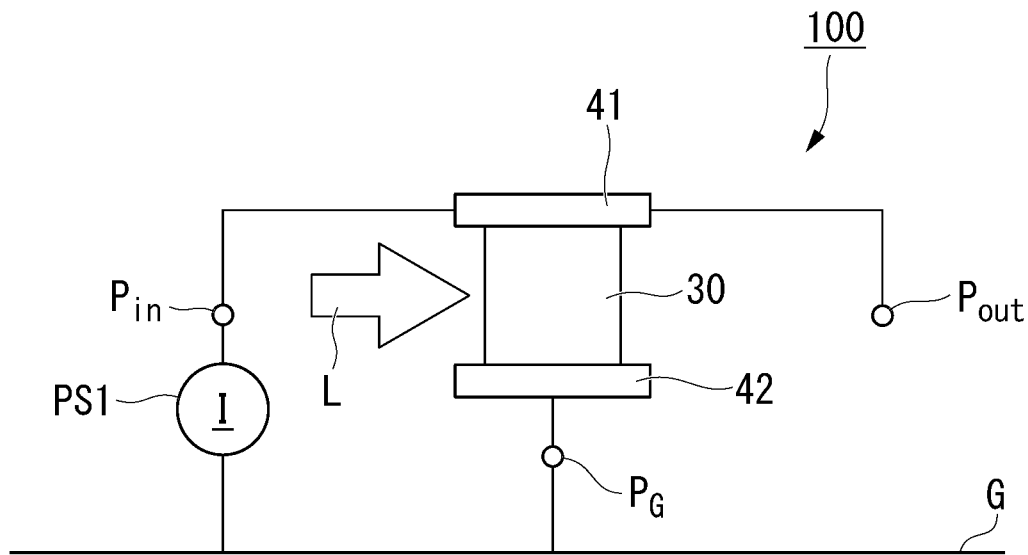
FIG. 5 is an example of a monitoring circuit of the optical device according to the first embodiment.
Figure 6:
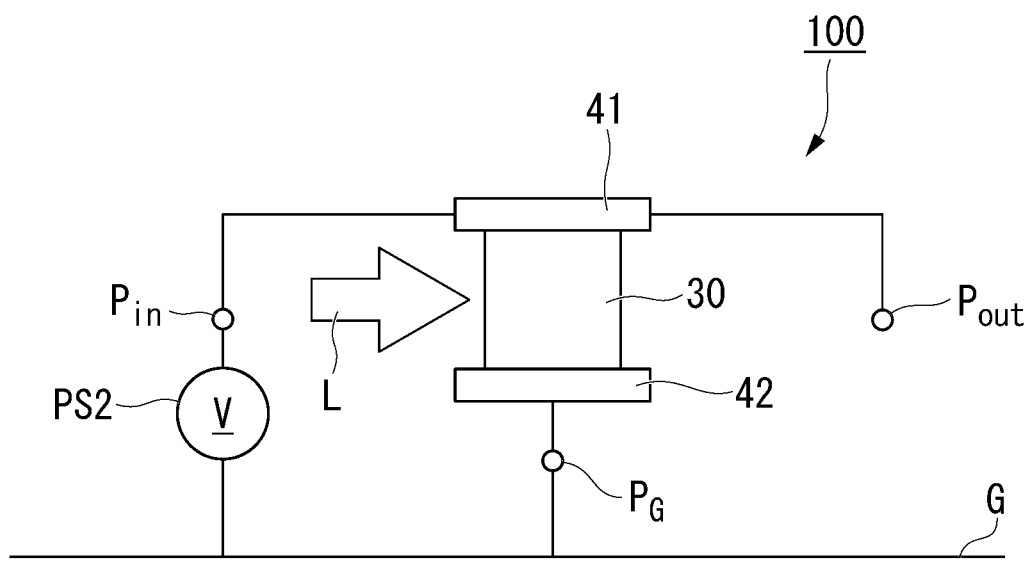
FIG. 6 is another example of a monitoring circuit of the optical device according to the first embodiment.

FIGS. 5 and 6 are examples of a light monitoring circuit using the magnetic element 30 of the optical device 100 according to the first embodiment. In FIGS. 5 and 6, the electrode 41 is connected to, for example, an input terminal $P_{in}$ and an output terminal $P_{out}$. In FIGS. 5 and 6, the electrode 42 is connected to, for example, a reference electric potential terminal $P_G$. The input terminal $P_{in}$ corresponds to one of the input terminals 45 in FIGS. 3 and 4. The output terminal $P_{out}$ corresponds to one of the output terminals 46 in FIGS. 3 and 4. The reference electric potential terminal $P_G$ corresponds to the other of the input terminals 45 and the other of the output terminals 46 in FIGS. 3 and 4. The reference electric potential in FIGS. 5 and 6 is a ground G. The ground G may be provided outside the optical device 100. The reference electric potential may be other than the ground G.

The magnetic element 30 converts a change in a state of applied light (monitoring light L) into an electric signal. An output voltage or an output current from the magnetic element 30 changes in accordance with an intensity of the applied light (the monitoring light L).

The input terminal $P_{in}$ is connected to a current source PS1 or a voltage source PS2. The current source PS1 and the voltage source PS2 may be outside the optical device 100. When the input terminal $P_{in}$ is connected to the current source PS1, the output terminal $P_{out}$ outputs a resistance value of the magnetic element 30 in the lamination direction as a voltage. When the input terminal $P_{in}$ is connected to the voltage source PS2, the output terminal $P_{out}$ outputs the resistance value of the magnetic element 30 in the lamination direction as a current. When it is not necessary to apply a current or a voltage to the magnetic element 30 from the outside, the input terminal $P_{in}$ and the current source PS1 or the voltage source PS2 may be omitted.

Figure 7:
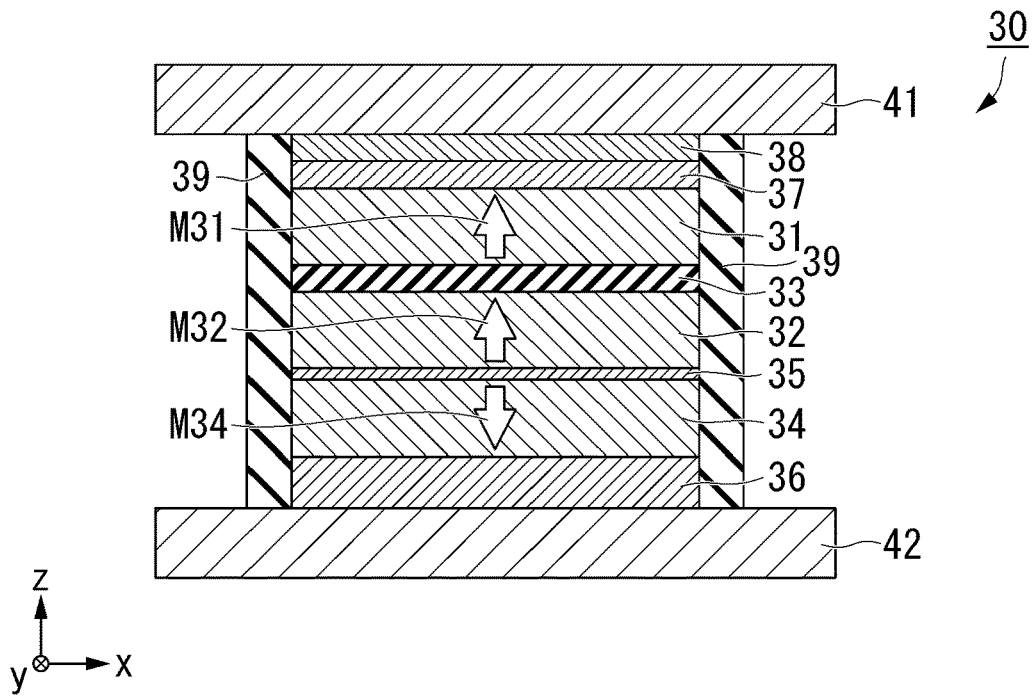
FIG. 7 is a cross-sectional view in the vicinity of the magnetic element according to the first embodiment.

FIG. 7 is a cross-sectional view of the magnetic element 30 according to the first embodiment. In FIG. 7, the electrodes 41 and 42 are illustrated at the same time, and a magnetization direction in an initial state of a ferromagnetic material is indicated by an arrow.

The magnetic element 30 includes at least a first ferromagnetic layer 31, a second ferromagnetic layer 32, and a spacer layer 33. The spacer layer 33 is positioned between the first ferromagnetic layer 31 and the second ferromagnetic layer 32. In addition to these, the magnetic element 30 may include a third ferromagnetic layer 34, a magnetic coupling layer 35, an underlayer 36, a perpendicular magnetization inducing layer 37, a cap layer 38, a side wall insulating layer 39, or the like. The magnetic element 30 has a maximum width of, for example, 2000 nm or less in a plan view from the lamination direction. The magnetic element 30 has the maximum width of, for example, 10 nm or more in a plan view from the lamination direction.

The magnetic element 30 is, for example, a magnetic tunnel junction (MTJ) element in which the spacer layer 33 is formed of an insulating material. In this case, in the magnetic element 30, a resistance value thereof in the lamination direction (a resistance value when a current is caused to flow in the lamination direction) changes according to a relative change between a state of a magnetization M31 of the first ferromagnetic layer 31 and a state of a magnetization M32 of the second ferromagnetic layer 32. Such an element is also called a magnetoresistance effect element.

The first ferromagnetic layer 31 is a photodetection layer whose magnetization state changes when light is applied from the outside. The first ferromagnetic layer 31 is also called a magnetization free layer. The magnetization free layer is a layer containing a magnetic material whose magnetization state changes when a predetermined external energy is applied. The predetermined external energy may be, for example, light applied from the outside (the monitoring light L), a current flowing in the lamination direction of the magnetic element 30, and an external magnetic field. A state of the magnetization M31 of the first ferromagnetic layer 31 changes in accordance with an intensity of the light (the monitoring light L) applied to the first ferromagnetic layer 31.

The first ferromagnetic layer 31 contains a ferromagnetic material. The first ferromagnetic layer 31 contains at least one of magnetic elements such as, for example, Co, Fe, or Ni. The first ferromagnetic layer 31 may contain a non-magnetic element such as B, Mg, Hf, or Gd in addition to the magnetic elements as described above. The first ferromagnetic layer 31 may be an alloy containing, for example, a magnetic element and a non-magnetic element. The first ferromagnetic layer 31 may be formed of a plurality of layers. The first ferromagnetic layer 31 may be, for example, a CoFeB alloy, a laminate in which a CoFeB alloy layer is sandwiched between Fe layers, or a laminate in which a CoFeB alloy layer is sandwiched between CoFe layers.

The first ferromagnetic layer 31 may be an in-plane magnetization film having an axis of easy magnetization in a film in-plane direction, or a perpendicular magnetization film having an axis of easy magnetization in a direction perpendicular to the film surface (the lamination direction of the magnetic elements 30).

A film thickness of the first ferromagnetic layer 31 may be, for example, 1 nm or more and 5 nm or less. The film thickness of the first ferromagnetic layer 31 may be, for example, 1 nm or more and 2 nm or less. In a case in which the first ferromagnetic layer 31 is a perpendicular magnetization film, when a film thickness of the first ferromagnetic layer 31 is small, an effect of applying perpendicular magnetic anisotropy from upper and lower layers of the first ferromagnetic layer 31 is strengthened, and the perpendicular magnetic anisotropy of the first ferromagnetic layer 31 is enhanced. That is, when the perpendicular magnetic anisotropy of the first ferromagnetic layer 31 is high, a force that the magnetization M31 tries to return in a direction perpendicular to the film surface (to the original state) is strengthened. On the other hand, when the film thickness of the first ferromagnetic layer 31 is large, the effect of applying perpendicular magnetic anisotropy from upper and lower layers of the first ferromagnetic layer 31 is relatively weakened, and the perpendicular magnetic anisotropy of the first ferromagnetic layer 31 is weakened.

When the film thickness of the first ferromagnetic layer 31 decreases, a volume as a ferromagnetic material decreases, and when the film thickness increases, the volume as a ferromagnetic material increases. Reactivity of the magnetization M31 of the first ferromagnetic layer 31 when an external energy is applied is inversely proportional to a product (KuV) of a magnetic anisotropy (Ku) and a volume (V) of the first ferromagnetic layer 31. That is, when the product of the magnetic anisotropy and the volume of the first ferromagnetic layer 31 decreases, the reactivity to light enhances. From the viewpoint as described above, in order to enhance the reactivity to light, the volume of the first ferromagnetic layer 31 may be reduced after appropriately designing the magnetic anisotropy of the first ferromagnetic layer 31.

When the film thickness of the first ferromagnetic layer 31 is larger than 2 nm, an insertion layer made of, for example, Mo or W may be provided in the first ferromagnetic layer 31. That is, a laminate in which a ferromagnetic layer, an insertion layer, and a ferromagnetic layer are laminated in that order may be used as the first ferromagnetic layer 31. The perpendicular magnetic anisotropy of the entire first ferromagnetic layer 31 enhances due to interfacial magnetic anisotropy at an interface between the insertion layer and the ferromagnetic layer. A film thickness of the insertion layer may be, for example, 0.1 nm to 0.6 nm.

The second ferromagnetic layer 32 is a magnetization fixed layer. The magnetization fixed layer is a layer made of a magnetic material in which a magnetization state is less likely to change than the magnetization free layer when a predetermined external energy is applied. For example, the magnetization fixed layer is less likely to change in magnetization direction than the magnetization free layer when a predetermined external energy is applied. Also, for example, the magnetization fixed layer less likely to change in an amount of magnetization than the magnetization free layer when a predetermined external energy is applied. A coercivity of the second ferromagnetic layer 32 is larger than, for example, a coercivity of the first ferromagnetic layer 31. The second ferromagnetic layer 32 has, for example, an axis of easy magnetization in the same direction as the first ferromagnetic layer 31. The second ferromagnetic layer 32 may be an in-plane magnetization film or a perpendicular magnetization film.

A material constituting the second ferromagnetic layer 32 is, for example, the same as that of the first ferromagnetic layer 31. The second ferromagnetic layer 32 may be a laminate in which, for example, Co having a thickness of 0.4 nm to 1.0 nm, Mo having a thickness of 0.1 nm to 0.5 nm, a CoFeB alloy having a thickness of 0.3 nm to 1.0 nm, and Fe having a thickness of 0.3 nm to 1.0 nm is laminated in that order.

The magnetization M32 of the second ferromagnetic layer 32 may be fixed by, for example, magnetic coupling with the third ferromagnetic layer 34 via the magnetic coupling layer 35. In this case, a combination of the second ferromagnetic layer 32, the magnetic coupling layer 35, and the third ferromagnetic layer 34 may be referred to as a magnetization fixed layer.

The third ferromagnetic layer 34 is magnetically coupled to, for example, the second ferromagnetic layer 32. The magnetic coupling is, for example, an antiferromagnetic coupling and is caused by an RKKY interaction. A material constituting the third ferromagnetic layer 34 is, for example, the same as that of the first ferromagnetic layer 31. The magnetic coupling layer 35 may be, for example, Ru, Ir, or the like.

The spacer layer 33 is a non-magnetic layer disposed between the first ferromagnetic layer 31 and the second ferromagnetic layer 32. The spacer layer 33 is constituted by a layer formed of a conductor, an insulator, or a semiconductor, or a layer including an energizing point formed of a conductor in an insulator. A film thickness of the spacer layer 33 can be adjusted according to an orientation direction of the magnetization M31 of the first ferromagnetic layer 31 and the magnetization M32 of the second ferromagnetic layer 32 in an initial state to be described later.

For example, when the spacer layer 33 is made of an insulator, the magnetic element 30 has a magnetic tunnel junction (MTJ) formed of the first ferromagnetic layer 31, the spacer layer 33, and the second ferromagnetic layer 32. Such an element is called an MTJ element. In this case, the magnetic element 30 can exhibit a tunneling magnetoresistance (TMR) effect. When the spacer layer 33 is made of a metal, the magnetic element 30 can exhibit a giant magnetoresistance (GMR) effect. Such an element is called a GMR element. The magnetic element 30 may be referred to as an MTJ element, a GMR element, or the like depending on a constituent material of the spacer layer 3, but is also collectively referred to as a magnetoresistance effect element.

When the spacer layer 33 is formed of an insulating material, a material containing aluminum oxide, magnesium oxide, titanium oxide, silicon oxide, or the like can be used for the spacer layer 33. Also, the spacer layer 33 may contain elements such as Al, B, Si, and Mg or magnetic elements such as Co, Fe, and Ni in the above-described insulating materials. When the film thickness of the spacer layer 33 is adjusted so that a high TMR effect is exhibited between the first ferromagnetic layer 31 and the second ferromagnetic layer 32, a high magnetoresistance change rate can be obtained. In order to efficiently utilize the TMR effect, the film thickness of the spacer layer 33 may be about 0.5 to 5.0 nm or about 1.0 to 2.5 nm.

When the spacer layer 33 is formed of a non-magnetic conductive material, a conductive material such as Cu, Ag, Au, or Ru can be used. In order to efficiently utilize the GMR effect, the film thickness of the spacer layer 33 may be about 0.5 to 5.0 nm or about 2.0 to 3.0 nm.

When the spacer layer 33 is formed of a non-magnetic semiconductor material, a material such as zinc oxide, indium oxide, tin oxide, germanium oxide, gallium oxide, or ITO can be used. In this case, the film thickness of the spacer layer 33 may be about 1.0 to 4.0 nm.

When a layer in which an energizing point formed of a conductor is included in a non-magnetic insulator is applied as the spacer layer 33, a structure in which an energizing point formed of a non-magnetic conductor such as Cu, Au, or Al is included in a non-magnetic insulator formed of aluminum oxide or magnesium oxide may be used. Also, the conductor may be formed of a magnetic element such as Co, Fe, or Ni. In this case, the film thickness of the spacer layer 33 may be about 1.0 to 2.5 nm. The energizing point is, for example, a columnar body having a diameter of 1 nm or more and 5 nm or less when viewed from a direction perpendicular to the film surface.

The underlayer 36 is between the second ferromagnetic layer 32 and the electrode 42. The underlayer 36 is a seed layer or a buffer layer. The seed layer enhances crystallinity of a layer laminated on the seed layer. The seed layer may be, for example, Pt, Ru, Hf, Zr, or NiFeCr. A film thickness of the seed layer may be, for example, 1 nm or more and 5 nm or less. The buffer layer is a layer that alleviates lattice mismatching between different crystals. The buffer layer may be, for example, Ta, Ti, W, Zr, Hf or a nitride of these elements. A film thickness of the buffer layer may be, for example, 1 nm or more and 5 nm or less.

The cap layer 38 is between the first ferromagnetic layer 31 and the electrode 41. The cap layer 38 prevents damage to a lower layer during the process and enhances crystallinity of the lower layer during annealing. A film thickness of the cap layer 38 may be, for example, 3 nm or less so that the first ferromagnetic layer 31 is irradiated with sufficient light. The cap layer 38 may be formed of, for example, MgO, W, Mo, Ru, Ta, Cu, Cr, or a laminated film thereof.

The perpendicular magnetization inducing layer 37 is formed when the first ferromagnetic layer 31 is a perpendicular magnetization film. The perpendicular magnetization inducing layer 37 is laminated on the first ferromagnetic layer 31. The perpendicular magnetization inducing layer 37 induces perpendicular magnetic anisotropy of the first ferromagnetic layer 31. The perpendicular magnetization inducing layer 37 may be, for example, magnesium oxide, W, Ta, Mo, or the like. When the perpendicular magnetization inducing layer 37 is magnesium oxide, the magnesium oxide may be oxygen deficient in order to enhance conductivity. A film thickness of the perpendicular magnetization inducing layer 37 may be, for example, 0.5 nm or more and 2.0 nm or less.

The side wall insulating layer 39 covers a periphery of the laminate including the first ferromagnetic layer 31 and the second ferromagnetic layer 32. The side wall insulating layer 39 may be, for example, an oxide, a nitride, or an oxynitride of Si, Al, or Mg.

The magnetic element 30 is manufactured by a lamination step, an annealing step, and a processing step for each layer. First, the electrode 42, the underlayer 36, the third ferromagnetic layer 34, the magnetic coupling layer 35, the second ferromagnetic layer 32, the spacer layer 33, the first ferromagnetic layer 31, the perpendicular magnetization inducing layer 37, and the cap layer 38 are laminated in that order on the substrate 27 (on a part of the clad 28). The substrate 27 is the same as the substrate on which the waveguide 20 is formed. Each layer is formed by, for example, sputtering.

Then, the laminated film is annealed. An annealing temperature may be, for example, 250° C. to 450° C. Thereafter, the laminated film is processed into a predetermined columnar body by photolithography and etching. The columnar body may be a circular column or a prismatic column. For example, a minimum width when the columnar body is viewed from the lamination direction may be 10 nm or more and 2000 nm or less, or 30 nm or more and 500 nm or less.

Next, an insulating layer is formed to cover a lateral surface of the columnar body. The insulating layer is the side wall insulating layer 39. The side wall insulating layer 39 may be laminated a plurality of times. Next, an upper surface of the cap layer 38 is exposed from the side wall insulating layer 39 by chemical mechanical polishing (CMP), and the electrode 41 is manufactured on the cap layer 38. With the above-described steps, the magnetic element 30 is obtained. The magnetic element 30 can be manufactured regardless of a material constituting the base. Therefore, the magnetic element 30 can be directly manufactured on the substrate 27 on which the waveguide 20 is formed without interposing an adhesive layer or the like. The magnetic element 30 can be formed by processes on the same substrate 27 together with the waveguide 20. For example, the waveguide 20 and the magnetic element 30 can be formed on the same substrate 27 by a vacuum deposition process.

Next, some examples of an operation of the optical device 100 will be described. Operations performed by the optical device 100 include an output operation in which light emitted from each of the laser diodes 11, 12, and 13 is combined and output, and a monitoring operation for monitoring the light emitted from each of the laser diodes 11, 12, and 13.

First, the output operation will be described. Light is emitted from each of the laser diodes 11, 12, and 13. The light emitted from the laser diodes 11, 12, and 13 is respectively input to the input waveguides 21, 22, and 23. The light output from the laser diode 11 propagates in the input waveguide 21. The light output from the laser diode 12 propagates in the input waveguide 22. The light output from the laser diode 13 propagates in the input waveguide 23.

The light propagating in each of the input waveguides 21, 22 and 23 is combined at the combined waveguide 24. The light combined at the combined waveguide 24 propagate in the output waveguide 25. The light combined at the combined waveguide 24 is output from one end of the output waveguide 25.

Next, the monitoring operation will be described. In the monitoring operation, light is emitted from one of the laser diodes 11, 12, and 13. For example, light is emitted from the laser diode 11. In this case, the light emitted from the laser diode 11 propagate in the input waveguide 21, the combined waveguide 24, and the output waveguide 25 in the order of the input waveguide 21, the combined waveguide 24, and the output waveguide 25. At least some of the light propagating in the output waveguide 25 branches into the monitoring waveguide 26. The branched light propagates in the monitoring waveguide 26 as monitoring light.

The light (monitoring light) propagating in the monitoring waveguide 26 is applied to the magnetic element 30. The monitoring light is applied to the magnetic element 30 from, for example, a direction intersecting the lamination direction (z direction in FIG. 3) of the magnetic element 30. For example, the monitoring light is applied to the lateral surface of the magnetic element 30 from the y direction.

An output voltage or an output current from the magnetic element 30 changes according to an intensity of the light (the monitoring light L) applied to the first ferromagnetic layer 31. An exact mechanism by which the output voltage or the output current from the magnetic element 30 changes due to light irradiation has not yet been clarified, but for example, the following two mechanisms can be considered.

Figure 8:
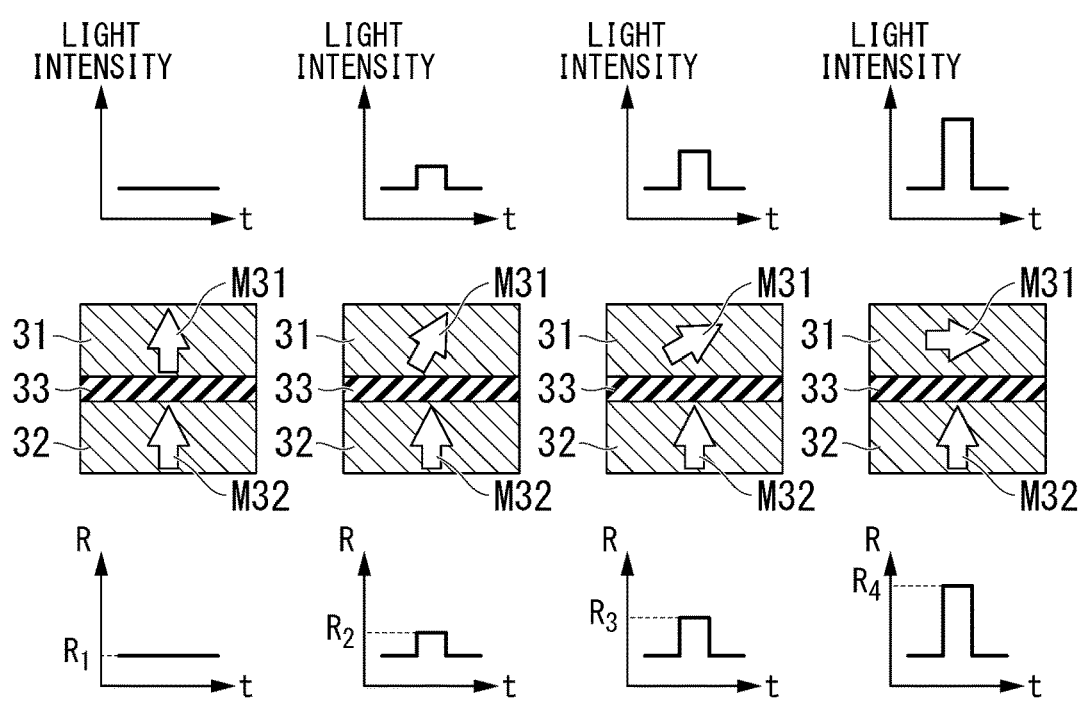
FIG. 8 is a diagram for explaining a first mechanism of the magnetic element according to the first embodiment.

FIG. 8 is a diagram for explaining a first mechanism of operation of the magnetic element 30 according to the first embodiment. In the upper graph of FIG. 8, the vertical axis represents an intensity of light applied to the first ferromagnetic layer 31, and the horizontal axis represents time. In the lower graph of FIG. 8, the vertical axis represents a resistance value of the magnetic element 30 in the lamination direction, and the horizontal axis represents time.

First, in a state in which light of a first intensity is applied to the first ferromagnetic layer 31 (hereinafter referred to as an initial state), the magnetization M31 of the first ferromagnetic layer 31 and the magnetization M32 of the second ferromagnetic layer 32 are in a parallel relationship, the resistance value of the magnetic element 30 in the lamination direction indicates a first resistance value $R_1$, and an amount of the output voltage or the output current from the magnetic element 30 indicates a first value. The first intensity may be a case in which the intensity of the light applied to the first ferromagnetic layer 31 is zero.

The resistance value of the magnetic element 30 in the lamination direction is obtained, for example, by using Ohm's law from voltage values that are generated at both ends of the magnetic element 30 in the lamination direction when a sense current is caused to flow in the lamination direction of the magnetic element 30. The output voltage from the magnetic element 30 is generated between the electrode 41 and the electrode 42. In the case of the example illustrated in FIG. 8, the sense current may flow from the first ferromagnetic layer 31 toward the second ferromagnetic layer 32. When the sense current is caused to flow in this direction, a spin transfer torque in the same direction as the magnetization M32 of the second ferromagnetic layer 32 acts on the magnetization M31 of the first ferromagnetic layer 31, and the magnetization M31 and the magnetization M32 become parallel in the initial state. Also, when the sense current is caused to flow in this direction, the magnetization M31 of the first ferromagnetic layer 31 can be prevented from being reversed during operation.

Next, an intensity of the light applied to the first ferromagnetic layer 31 changes. The magnetization M31 of the first ferromagnetic layer 31 is inclined from the initial state by an external energy due to the irradiation of light. An angle between a direction of the magnetization M31 of the first ferromagnetic layer 31 when the first ferromagnetic layer 31 is not irradiated with the light and a direction of the magnetization M31 when the first ferromagnetic layer 31 is irradiated with the light is larger than 0° and smaller than 90°.

When the magnetization M31 of the first ferromagnetic layer 31 is inclined from the initial state, the resistance value of the magnetoresistance effect element 30 in the lamination direction changes. Then, the output voltage or the output current from the magnetic element 30 changes. For example, an inclination of the magnetization M31 with respect to that in the initial state increases as the intensity of the light (the monitoring light L) applied to the magnetic element 30 increases. For example, according to the inclination of the magnetization M31 of the first ferromagnetic layer 31, the resistance value of the magnetic element 30 in the lamination direction changes to a second resistance value $R_2$, a third resistance value $R_3$, and a fourth resistance value $R_4$, and the output voltage or the output current from the magnetic element 30 changes to a second value, a third value, and a fourth value. The resistance value increases in the order of the first resistance value $R_1$, the second resistance value $R_2$, the third resistance value $R_3$, and the fourth resistance value $R_4$. The output voltage from the magnetic element 30 increases in the order of the first value, the second value, the third value, and the fourth value. When the magnetic element 30 is connected to a constant voltage source, the output current from the magnetic element 30 decreases in the order of the first value, the second value, the third value, and the fourth value.

In the magnetic element 30, when the intensity of the light (the monitoring light L) applied to the magnetic element 30 changes, the output voltage or the output current from the magnetic element 30 (resistance value of the magnetic element 30 in the lamination direction) changes. Therefore, the magnetic element 30 can detect an intensity of the monitoring light L as an output voltage or an output current (resistance value of the magnetic element 30) from the magnetic element 30.

Since a spin transfer torque in the same direction as the magnetization M32 of the second ferromagnetic layer 32 acts on the magnetization M31 of the first ferromagnetic layer 31, when the intensity of the light applied to the first ferromagnetic layer 31 returns to the first intensity, the magnetization M31 that has been inclined from the initial state returns to the initial state. When the magnetization M31 returns to the initial state, the resistance value of the magnetic element 30 in the lamination direction returns to the first resistance value $R_1$, and the output voltage or the output current from the magnetic element 30 returns to the first value.

Here, a case in which the magnetization M31 and the magnetization M32 are parallel to each other in the initial state has been described as an example, but the magnetization M31 and the magnetization M32 may be anti-parallel to each other in the initial state. In this case, the resistance value of the magnetic element 30 in the lamination direction becomes smaller as the magnetization M31 becomes more inclined (as the angle change from the initial state of the magnetization M31 becomes larger). When the initial state is a case in which the magnetization M31 and the magnetization M32 are anti-parallel to each other, the sense current may flow from the second ferromagnetic layer 32 toward the first ferromagnetic layer 31. When the sense current is caused to flow in this direction, the spin transfer torque acts on the magnetization M31 of the first ferromagnetic layer 31 in a direction opposite to the magnetization M32 of the second ferromagnetic layer 32, and the magnetization M31 and the magnetization M32 become anti-parallel to each other in the initial state.

Figure 9:
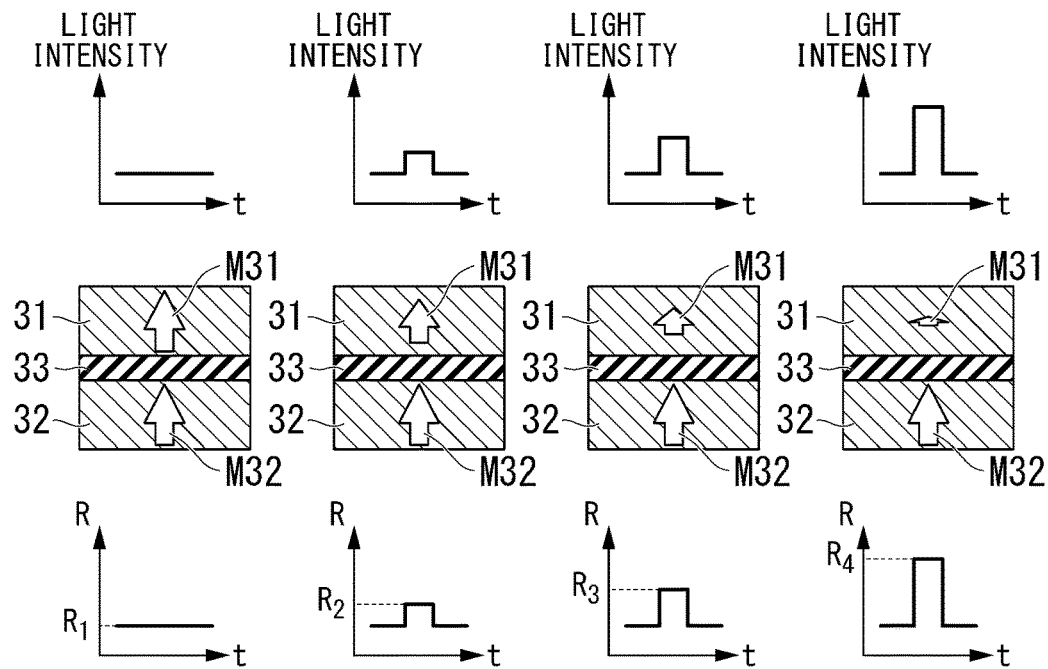
FIG. 9 is a diagram for explaining a second mechanism of the magnetic element according to the first embodiment.

FIG. 9 is a diagram for explaining a second mechanism of operation of the magnetic element 30 according to the first embodiment. In the upper graph of FIG. 9, the vertical axis represents an intensity of light applied to the first ferromagnetic layer 31, and the horizontal axis represents time. In the lower graph of FIG. 9, the vertical axis represents a resistance value of the magnetic element 30 in the lamination direction, and the horizontal axis represents time.

An initial state illustrated in FIG. 9 is the same as the initial state illustrated in FIG. 8. Also in the case of the example illustrated in FIG. 9, a sense current may flow from the first ferromagnetic layer 31 toward the second ferromagnetic layer 32. When the sense current is caused to flow in this direction, a spin transfer torque in the same direction as the magnetization M32 of the second ferromagnetic layer 32 acts on the magnetization M31 of the first ferromagnetic layer 31, and the initial state is maintained.

Next, an intensity of the light (monitoring light) applied to the first ferromagnetic layer 31 changes. An amount of the magnetization M31 of the first ferromagnetic layer 31 decreases from the initial state by an external energy due to the irradiation of light. When the magnetization M31 of the first ferromagnetic layer 31 decreases from the initial state, a resistance value of the magnetoresistance effect element 30 in the lamination direction changes. Then, an output voltage or an output current from the magnetic element 30 changes. For example, the amount of the magnetization M31 decreases as the intensity of the light (the monitoring light L) applied to the magnetic element 30 increases. For example, according to the amount of the magnetization M31 of the first ferromagnetic layer 31, the resistance value of the magnetic element 30 in the lamination direction changes to a second resistance value $R_2$, a third resistance value $R_3$, and a fourth resistance value $R_4$, and the output voltage or the output current from the magnetic element 30 changes to a second value, a third value, and a fourth value. The resistance value increases in the order of the first resistance value $R_1$, the second resistance value $R_2$, the third resistance value $R_3$, and the fourth resistance value $R_4$. The output voltage from the magnetic element 30 increases in the order of the first value, the second value, the third value, and the fourth value. When the magnetic element 30 is connected to a constant voltage source, the output current from the magnetic element 30 decreases in the order of the first value, the second value, the third value, and the fourth value.

When the intensity of the light applied to the first ferromagnetic layer 31 returns to the first intensity, the amount of the magnetization M31 of the first ferromagnetic layer 31 returns to an original amount, and the magnetic element 30 returns to the initial state. That is, the resistance value of the magnetic element 30 in the lamination direction returns to the first resistance value $R_1$, and the output voltage or the output current from the magnetic element 30 returns to the first value.

Also in FIG. 9, the magnetization M31 and the magnetization M32 may be anti-parallel to each other in the initial state. In this case, the resistance value of the magnetic element 30 in the lamination direction decreases as the amount of the magnetization M31 decreases. When the initial state is a case in which the magnetization M31 and the magnetization M32 are anti-parallel to each other, the sense current may flow from the second ferromagnetic layer 32 toward the first ferromagnetic layer 31.

Through the above-described procedure, an intensity of the light output from the laser diode 11 can be read as the output voltage or the output current from the magnetic element 30 (resistance value of the magnetic element 30 in the lamination direction). Then, with the same procedure, an intensity of light output from the laser diode 12 and an intensity of light output from the laser diode 13 are sequentially measured.

The light output from one end of the output waveguide 25 is a combination of the light output from each of the laser diodes 11, 12, and 13. When an intensity of the light output from each of the laser diodes 11, 12, and 13 is adjusted, a white balance of the output light from the optical device 100 can be adjusted. The intensity of the light output from each of the laser diodes 11, 12, and 13 can be adjusted by, for example, feeding a measurement result of the output from the magnetic element 30 back to each of the laser diodes 11, 12, and 13.

Also, the magnetization M31 of the first ferromagnetic layer 31 is more likely to change with respect to light irradiation as a volume of the first ferromagnetic layer 31 decreases. That is, as the volume of the first ferromagnetic layer 31 decreases, the magnetization M31 of the first ferromagnetic layer 31 is more likely to be inclined by irradiation of light, or more likely to become smaller by irradiation of light. In other words, when the volume of the first ferromagnetic layer 31 is made small, the magnetization M31 can be changed even with a small amount of light. That is, the magnetic element 30 according to the first embodiment can detect light with high sensitivity.

More accurately, ease of change in the magnetization M31 is determined by an amount of the product (KuV) of the magnetic anisotropy (Ku) and the volume (V) of the first ferromagnetic layer 31. As the KuV decreases, the magnetization M31 changes even with a smaller amount of light, and as the KuV increases, the magnetization M31 does not change unless the amount of light becomes larger. That is, the KuV of the first ferromagnetic layer 31 is designed according to an amount of light applied from the outside used in the application. When a case of detecting an extremely small amount of light is assumed, the extremely small amount of light can be detected by reducing the KuV of the first ferromagnetic layer 31. Such a detection for a small amount of light has a great advantage because it is difficult when an element size is reduced in a conventional p-n junction semiconductor. The KuV can be reduced by reducing the volume of the first ferromagnetic layer 31.

As described above, the optical device 100 according to the first embodiment can read an intensity of the light output from each of the laser diodes 11, 12, and 13 from an output voltage or an output current of the magnetic element 30 (a resistance value of the magnetic element 30 in the lamination direction). The optical device 100 according to the first embodiment can adjust a white balance of the light output from the output waveguide 25 by adjusting the intensity of the light output from the each of the laser diodes 11, 12, and 13.

Although the first embodiment has been described in detail with reference to the drawings, the first embodiment is not limited to the example.

Figure 10:
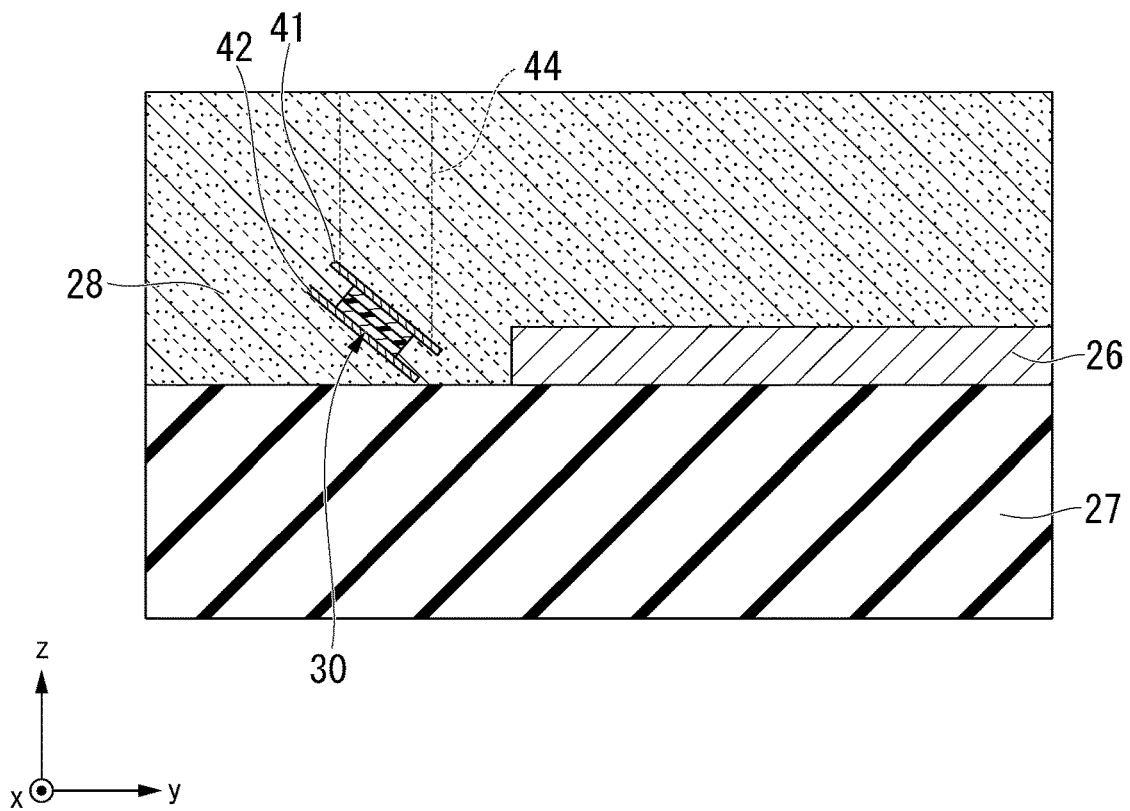
FIG. 10 is a cross-sectional view in the vicinity of the magnetic element of another example of the optical device according to the first embodiment.

For example, as illustrated in FIG. 10, a lamination direction of the magnetic element 30 may be inclined with respect to the z direction. In this case, the monitoring light is applied to a lateral surface of the magnetic element 30 and a first surface of the magnetic element 30 on the electrode 41 side.

In the optical device and the optical system according to the above-described embodiments light can be monitored by a novel principle.

Second Embodiment

Figure 11:
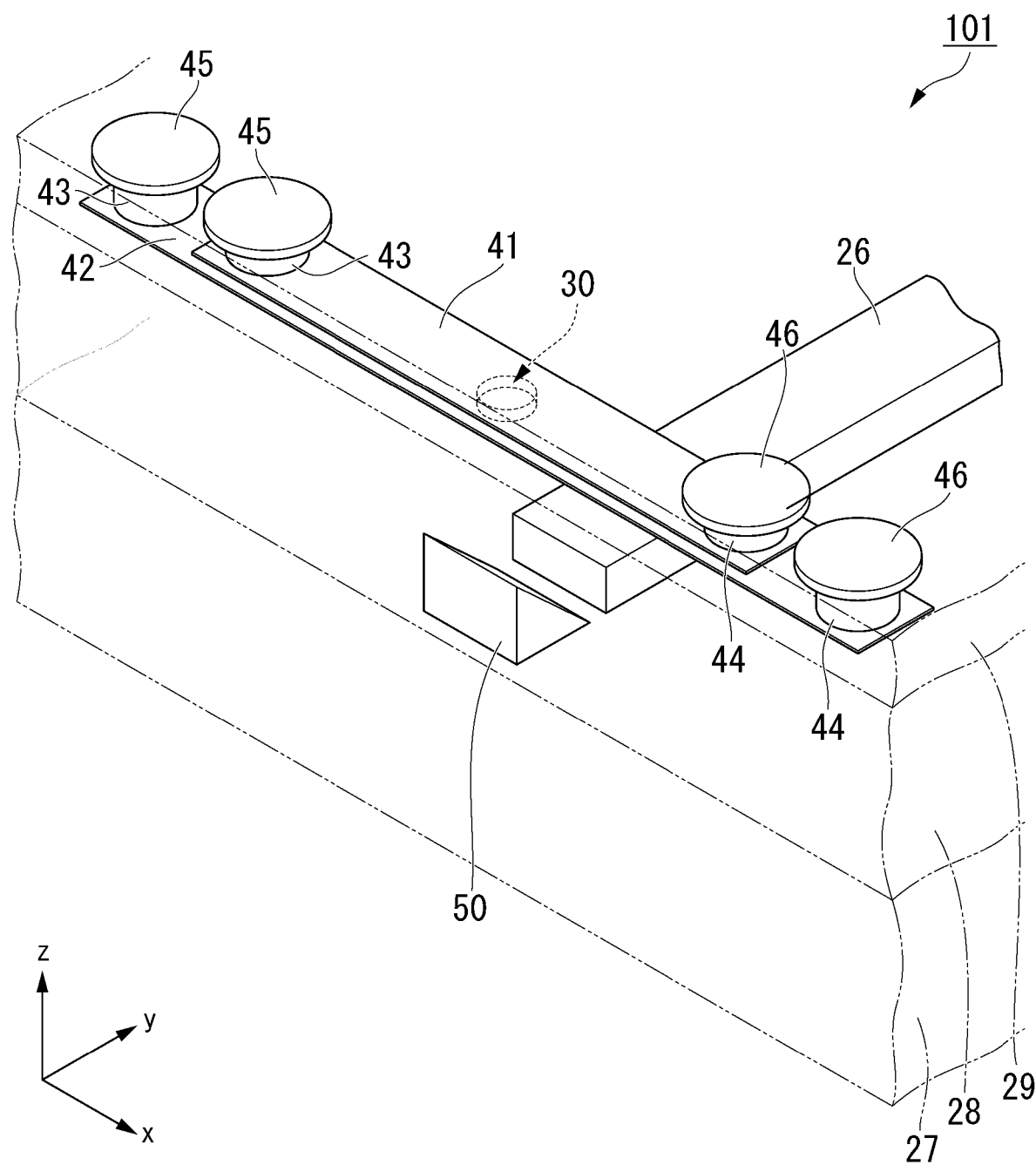
FIG. 11 is a perspective view in the vicinity of a magnetic element of an optical device according to a second embodiment.
Figure 12:
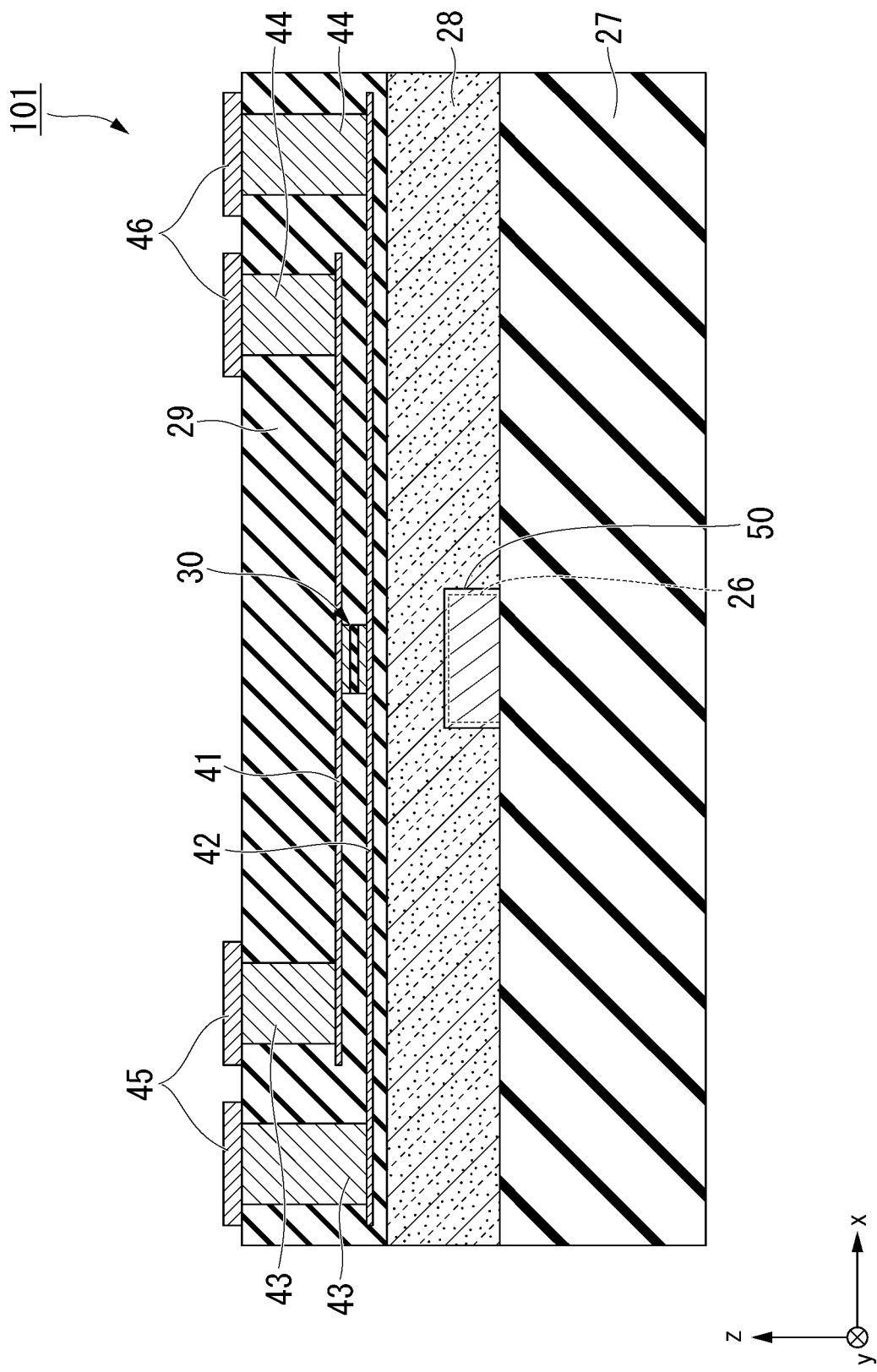
FIG. 12 is a cross-sectional view in the vicinity of the magnetic element of the optical device according to the second embodiment.
Figure 13:
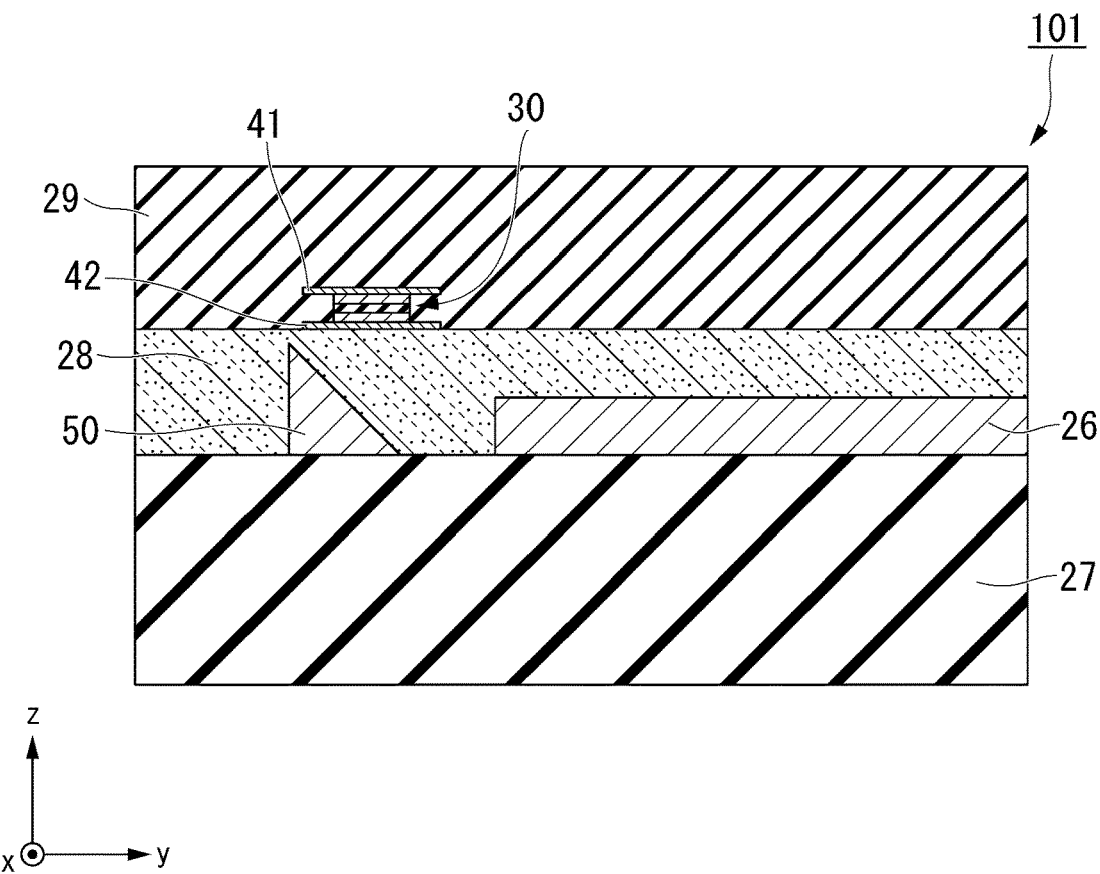
FIG. 13 is another cross-sectional view in the vicinity of the magnetic element of the optical device according to the second embodiment.

FIG. 11 is a perspective view in the vicinity of a magnetic element 30 of an optical device 101 according to a second embodiment. FIG. 12 is a cross-sectional view in the vicinity of the magnetic element 30 of the optical device 101 according to the second embodiment. FIG. 13 is another cross-sectional view in the vicinity of the magnetic element 30 of the optical device 101 according to the second embodiment. In the second embodiment, components the same as those in the first embodiment will be denoted by the same reference signs, and description thereof will be omitted.

The optical device 101 includes a reflector 50. The reflector 50 reflects light (monitoring light) output from a monitoring waveguide 26 toward the magnetic element 30. The reflector 50 is positioned at a position in a traveling direction of the monitoring light from an output end of the monitoring waveguide 26. The reflector 50 has an inclined surface that is inclined with respect to the traveling direction of the monitoring light.

The reflector 50 is configured to reflect light. The reflector 50 is, for example, a reflecting mirror.

The magnetic element 30 is formed in an insulating layer 29 formed on a clad 28. The insulating layer 29 is made of, for example, the same material as that of a side wall insulating layer 39. The magnetic element 30 is above the substrate 27. The magnetic element 30 is at a height position different from that of a waveguide 20 and is positioned to be further away from a substrate 27 than the waveguide 20. The magnetic element 30 is, for example, above the reflector 50.

The light (monitoring light) reflected by the reflector 50 is applied to the magnetic element 30 from, for example, a lamination direction of the magnetic element 30. In this case, an electrode 42 has transmittance with respect to a wavelength region of the light applied to the magnetic element 30. When the electrode 42 allows some of the monitoring light to pass, the magnetic element 30 is irradiated with the monitoring light. Here, an example in which the electrode 42 is disposed on the reflector 50 side with respect to an electrode 41 is illustrated, but the electrode 41 may be disposed on the reflector 50 side with respect to the electrode 42 (a first ferromagnetic layer 31 may be disposed on the reflector 50 side with respect to a second ferromagnetic layer 32). In this case, the electrode 41 has transmittance with respect to the wavelength region of the light applied to the magnetic element 30. When the electrode 41 is disposed on the reflector 50 side with respect to the electrode 42, irradiation efficiency of the monitoring light to the first ferromagnetic layer 31 is enhanced.

The optical device 101 according to the second embodiment achieves the same effects as in the optical device 100. Also, the reflector 50 allows an irradiation direction of the monitoring light with respect to the magnetic element 30 to be freely designed. For example, when the monitoring light is applied to the magnetic element 30 from the lamination direction, a wide light receiving area of the magnetic element 30 can be secured.

Third Embodiment

Figure 14:
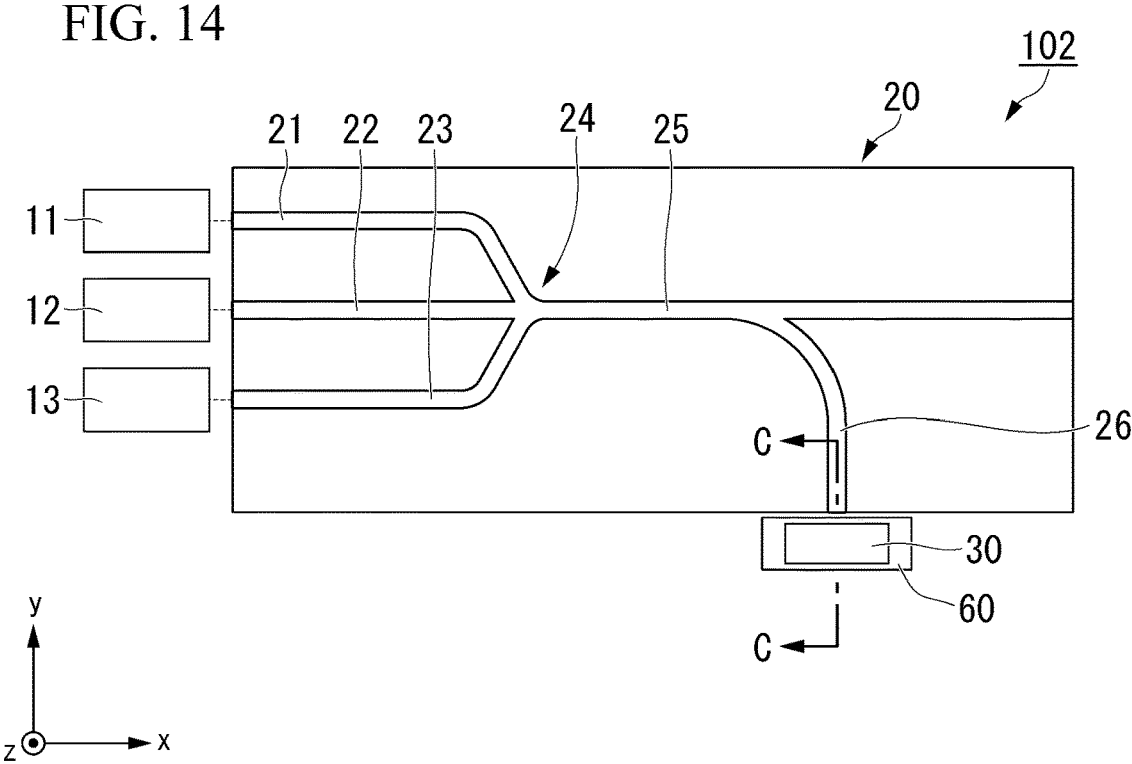
FIG. 14 is a plan view of an optical device according to a third embodiment.
Figure 15:
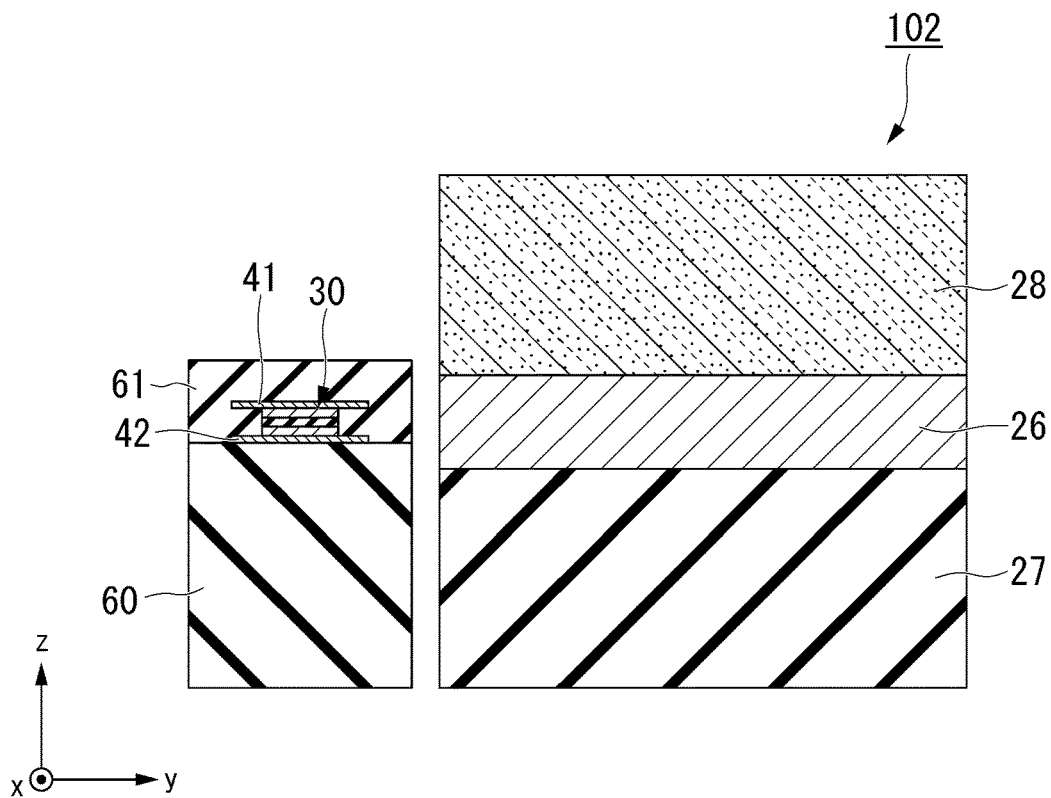
FIG. 15 is a cross-sectional view in the vicinity of a magnetic element of the optical device according to the third embodiment.

FIG. 14 is a plan view of an optical device 102 according to a third embodiment from a z direction. FIG. 15 is a cross-sectional view in the vicinity of a magnetic element 30 of the optical device 102 according to the third embodiment. FIG. 15 is a cross section along line C-C of FIG. 14. In the third embodiment, components the same as those in the first embodiment will be denoted by the same reference signs, and description thereof will be omitted.

The optical device 102 includes a support body 60 that supports the magnetic element 30. The support body 60 is different from a substrate 27 on which a waveguide 20 is formed. The support body 60 and the substrate 27 are fixed, for example, on a common support body. The support body 60 is made of, for example, the same material as that of the substrate 27. In the optical device 102, the magnetic element 30 is on or above the support body 60. The magnetic element 30 is in an insulating layer 61 formed on the support body 60. The insulating layer 61 is made of, for example, the same material as a side wall insulating layer 39.

In the example illustrated in FIGS. 14 and 15, a height position of the magnetic element 30 in the z direction is aligned with a height position of an output end of a monitoring waveguide 26 in the z direction.

The optical device 102 according to the third embodiment achieves the same effects as in the optical device 100. Also, the magnetic element 30 and the waveguide 20 can be separately manufactured, and restrictions at the time of manufacturing are reduced.

Fourth Embodiment

Figure 16:
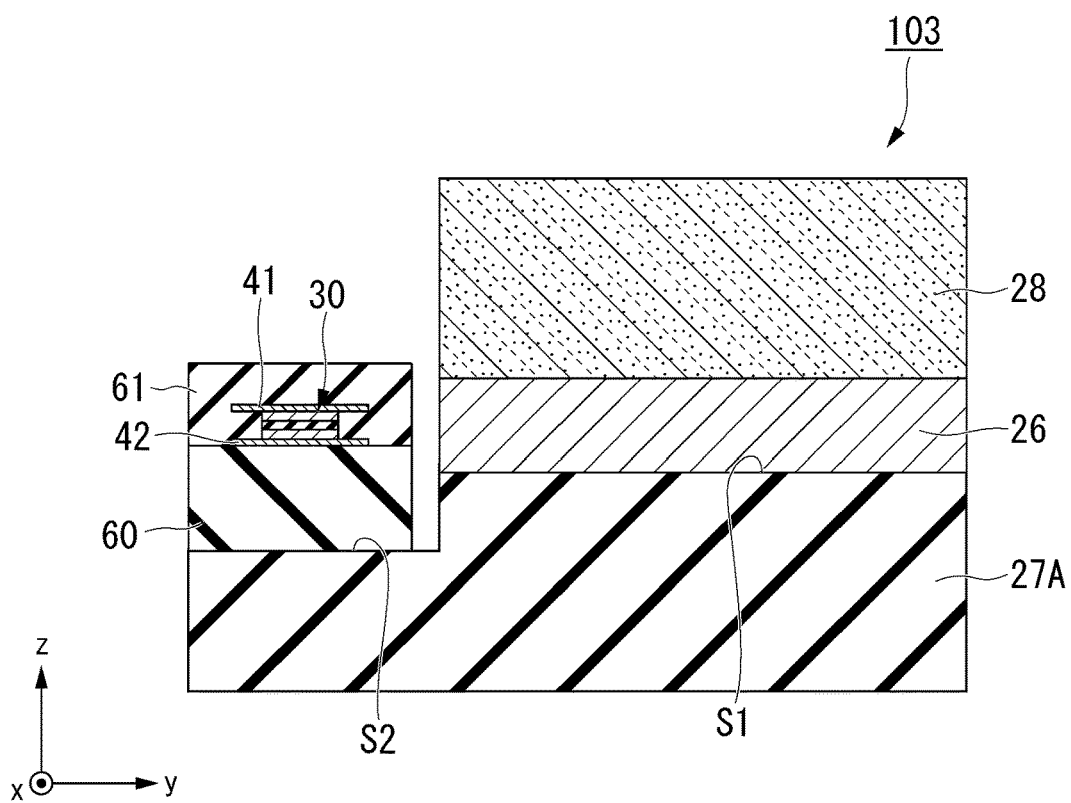
FIG. 16 is a cross-sectional view in the vicinity of a magnetic element of an optical device according to a fourth embodiment.

FIG. 16 is a cross-sectional view in the vicinity of a magnetic element 30 of an optical device 103 according to a fourth embodiment. In the fourth embodiment, components the same as those in the third embodiment will be denoted by the same reference signs, and description thereof will be omitted.

A substrate 27A is different from the substrate 27 in that a step is formed on an upper surface thereof. A height position in a z direction is different between an upper surface S1 and an upper surface S2. The upper surface S1 is an upper surface of the substrate 27A at a position overlapping a waveguide 20 when viewed from the z direction. The waveguide 20 is formed on the upper surface S1. The upper surface S2 is an upper surface of the substrate 27A at a position overlapping the magnetic element 30 when viewed from the z direction.

A support body 60 is placed on the upper surface S2. The magnetic element 30 is formed above the substrate 27A and on the support body 60.

The optical device 103 according to the fourth embodiment achieves the same effects as in the optical device 102.

Fifth Embodiment

Figure 17:
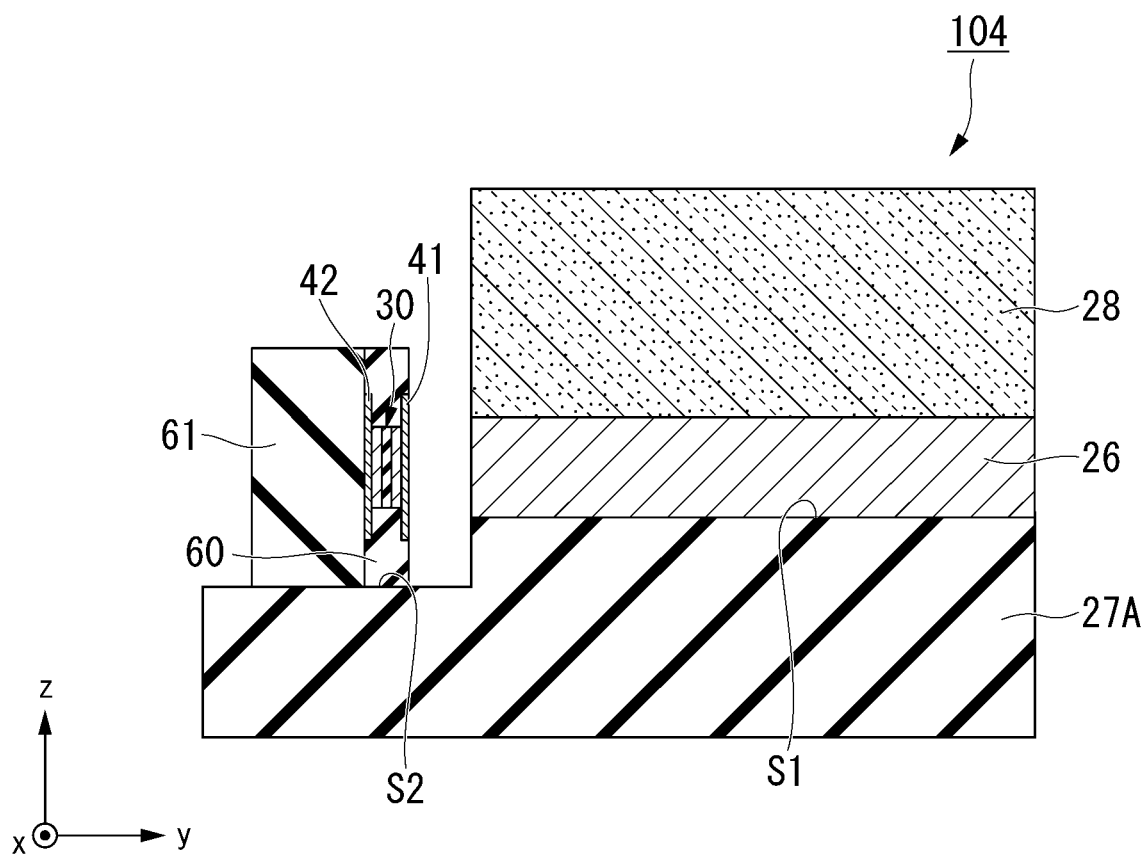
FIG. 17 is a cross-sectional view in the vicinity of a magnetic element of an optical device according to a fifth embodiment.
Figure 18:
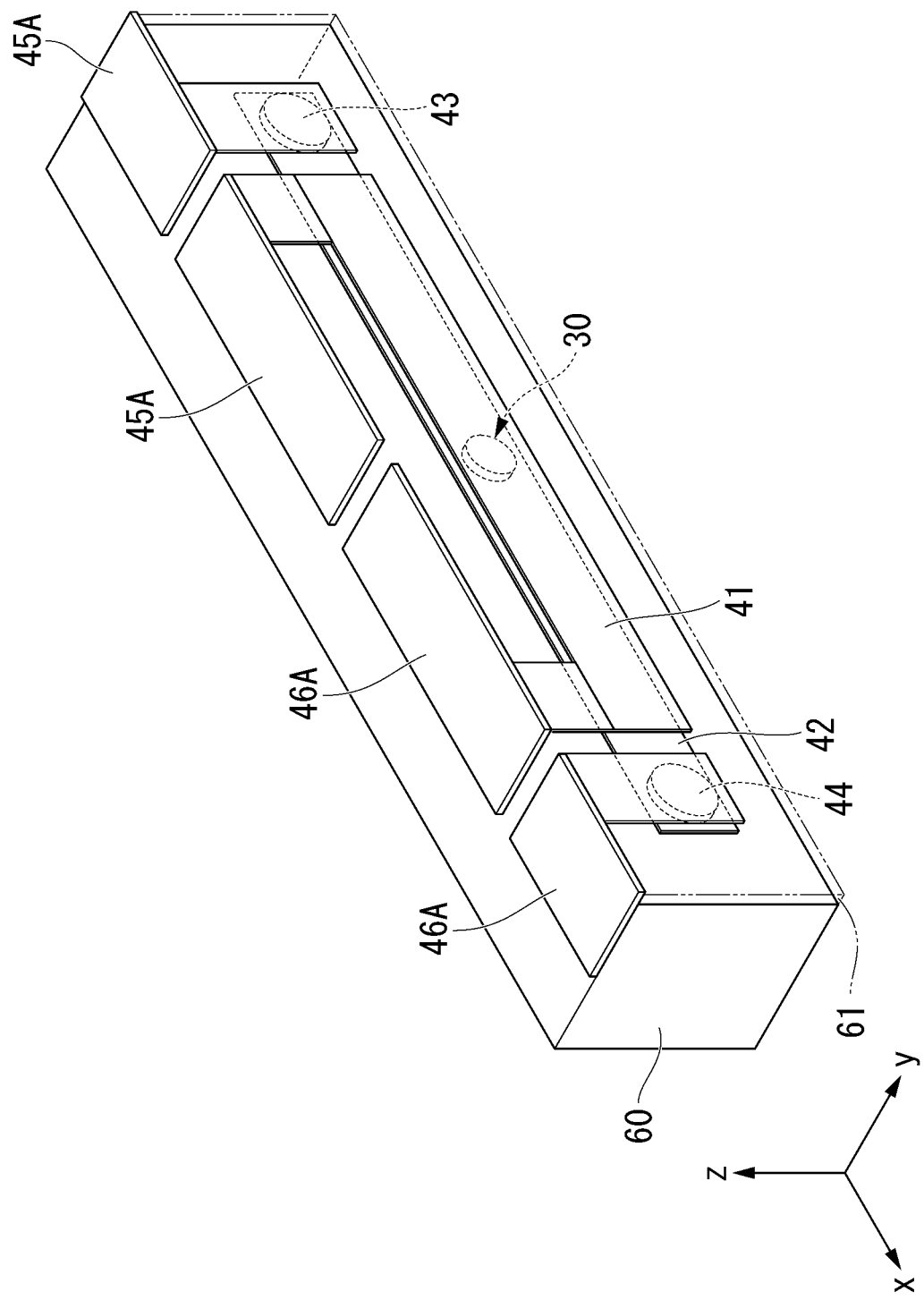
FIG. 18 is a perspective view in the vicinity of the magnetic element of the optical device according to the fifth embodiment.

FIG. 17 is a cross-sectional view in the vicinity of a magnetic element 30 of an optical device 104 according to a fifth embodiment. FIG. 18 is a perspective view in the vicinity of the magnetic element 30 of the optical device 104 according to the fifth embodiment. In the fifth embodiment, components the same as those in the fourth embodiment will be denoted by the same reference signs, and description thereof will be omitted.

In the optical device 104, a traveling direction of monitoring light from an output end of a monitoring waveguide 26 and a lamination direction of the magnetic element 30 coincide with each other. A support body 60 is installed so that, for example, a lateral surface of the support body 60 when the magnetic element 30 is laminated faces an upper surface S2 of a substrate 27A. The monitoring light is applied to the magnetic element 30 from, for example, the lamination direction of the magnetic element 30. In this case, an electrode 41 has transmittance with respect to a wavelength region of the light applied to the magnetic element 30. When the electrode 41 allows some of the monitoring light to pass, the magnetic element 30 is irradiated with the monitoring light.

As illustrated in FIG. 18, the electrode 41 is connected to an input terminal 45A and an output terminal 46A. The electrode 42 is connected to the input terminal 45A through a via wiring 43 and to the output terminal 46A through a via wiring 44. The input terminal 45A and the output terminal 46 are formed on a lateral surface of the support body 60.

The optical device 104 according to the fifth embodiment achieves the same effects as in the optical device 103. Also, when the monitoring light is applied to the magnetic element 30 from the lamination direction, a wide light receiving area of the magnetic element 30 can be secured.

Sixth Embodiment

Figure 19:
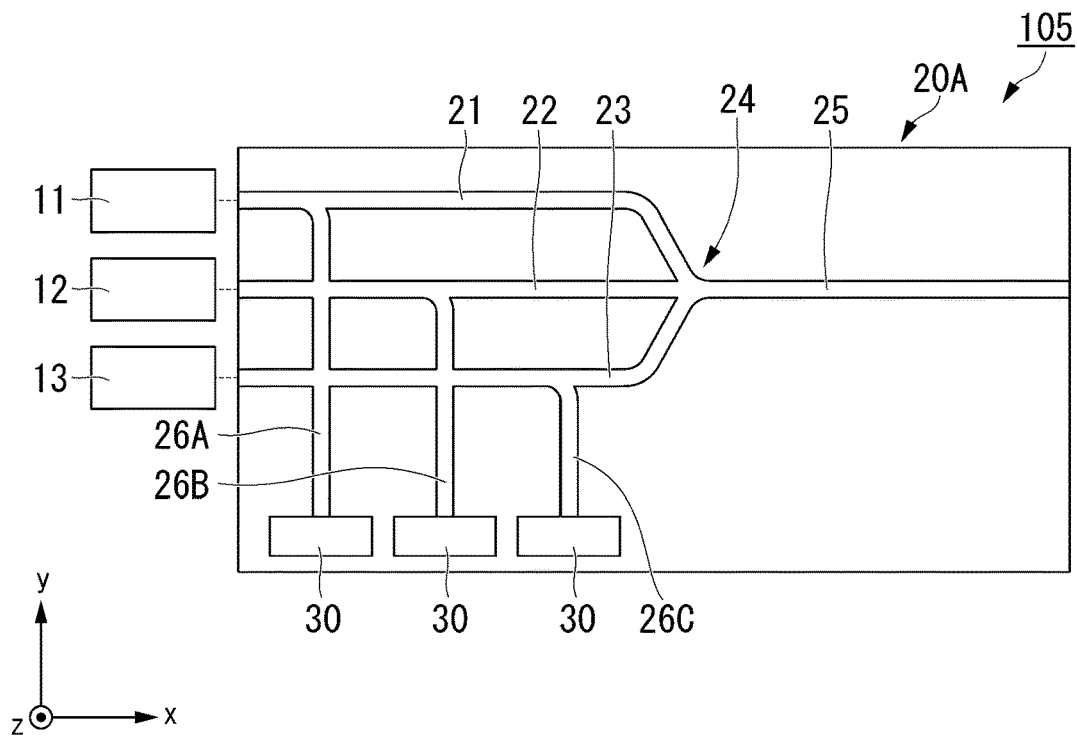
FIG. 19 is a plan view of an optical device according to a sixth embodiment.

FIG. 19 is a plan view of an optical device 105 according to a sixth embodiment from a z direction. In the sixth embodiment, components the same as those in the first embodiment will be denoted by the same reference signs, and description thereof will be omitted.

A shape of a waveguide 20A of the optical device 105 is different from that of the waveguide 20 of the optical device 100. The waveguide 20A includes, for example, input waveguides 21, 22, and 23, a combined waveguide 24, an output waveguide 25, and monitoring waveguides 26A, 26B, and 26C.

The monitoring waveguide 26A is connected to the input waveguide 21. The monitoring waveguide 26B is connected to the input waveguide 22. The monitoring waveguide 26C is connected to the input waveguide 23. At least some of light propagating in the input waveguide 21 propagates in the monitoring waveguide 26A as monitoring light. At least some of light propagating in the input waveguide 22 propagates in the monitoring waveguide 26B as monitoring light. At least some of light propagating in the input waveguide 23 propagates in the monitoring waveguide 26C as monitoring light.

The optical device 105 includes a plurality of magnetic elements 30. The light (monitoring light) propagating in the monitoring waveguides 26A, 26B, and 26C is applied to the respective magnetic elements 30.

The optical device 105 according to the sixth embodiment achieves the same effects as in the optical device 100.

The optical device 100 according to the first embodiment sequentially measures the light output from the laser diodes 11, 12, and 13 in the monitoring operation. On the other hand, the optical device 105 according to the sixth embodiment can simultaneously measure the light output from the laser diodes 11, 12, and 13 by the plurality of magnetic elements 30 in a monitoring operation.

Seventh Embodiment

Figure 20:
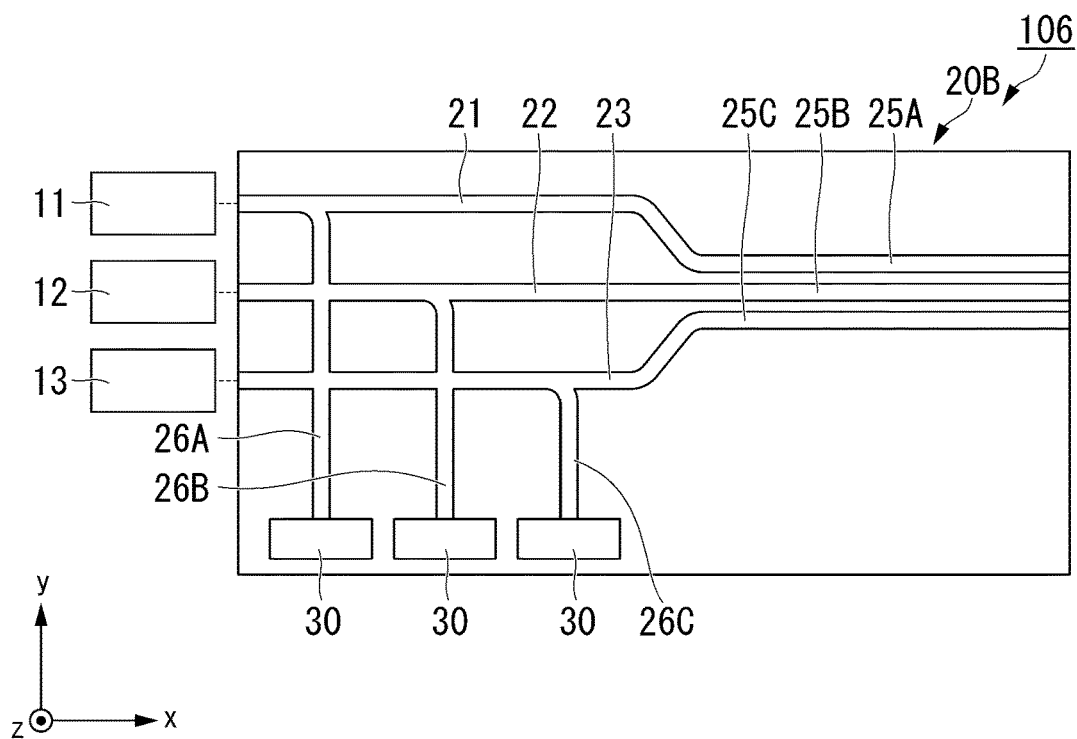
FIG. 20 is a plan view of an optical device according to a seventh embodiment.

FIG. 20 is a plan view of an optical device 106 according to a seventh embodiment from a z direction. In the seventh embodiment, components the same as those in the sixth embodiment will be denoted by the same reference signs, and description thereof will be omitted.

A shape of a waveguide 20B of the optical device 106 is different from that of the waveguide 20A of the optical device 105. The waveguide 20B includes, for example, input waveguides 21, 22, and 23, output waveguides 25A, 25B, 25C, and monitoring waveguides 26A, 26B, and 26C. The waveguide 20B does not include a combined waveguide 24. The output waveguide 25A is connected to the input waveguide 21. The output waveguide 25B is connected to the input waveguide 22. The output waveguide 25C is connected to the input waveguide 23.

In the optical device 106, light propagating in each of the input waveguides 21, 22 and 23 is not combined at a combined waveguide 24 in an output operation. If output ends of the output waveguides 25A, 25B, and 25C are sufficiently close to each other, light output from each of the output waveguides 25A, 25B, and 25C appears to human eyes as a combined wave.

The optical device 106 according to the seventh embodiment achieves the same effects as in the optical device 105. Here, an example in which the monitoring waveguides 26A, 26B, and 26C are connected to the input waveguides 21, 22, and 23, but the monitoring waveguide 26A may be connected to the output waveguide 25A, the monitoring waveguide 26B may be connected to the output waveguide 25B, and the monitoring waveguide 26C may be connected to the output waveguide 25C.

Eighth Embodiment

Figure 21:
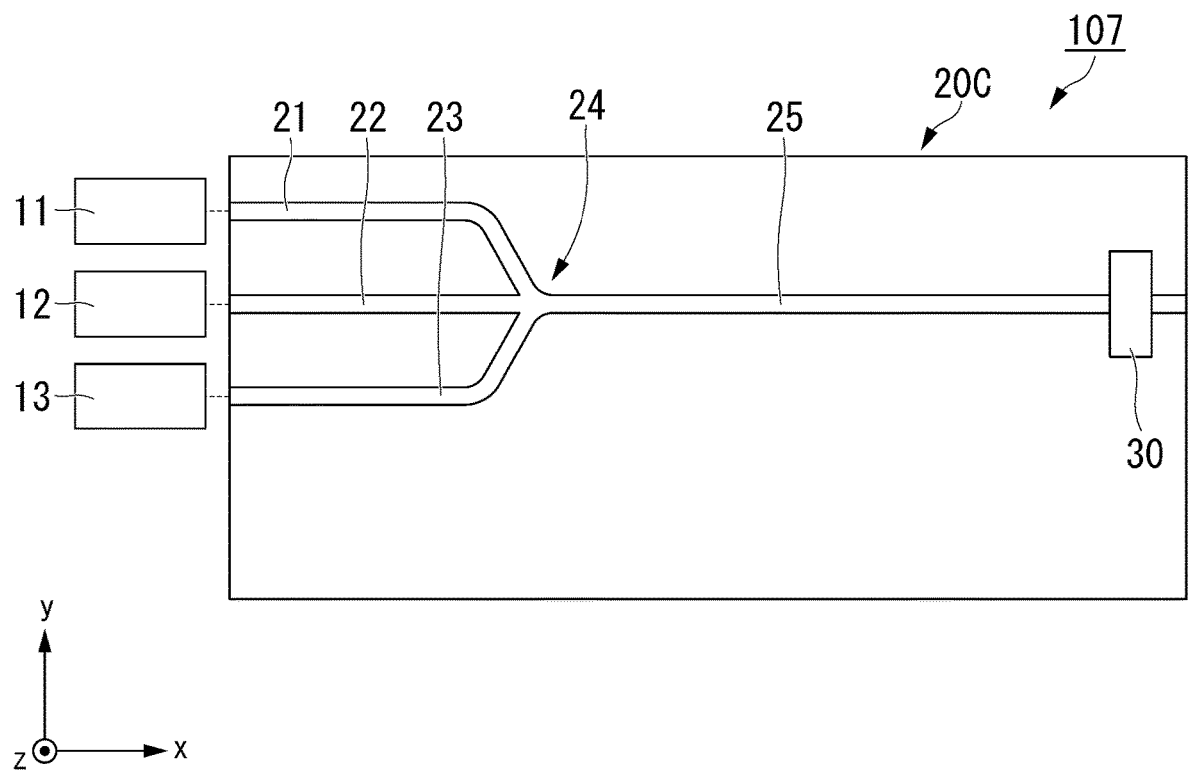
FIG. 21 is a plan view of an optical device according to an eighth embodiment.

FIG. 21 is a plan view of an optical device 107 according to an eighth embodiment from a z direction. In the eighth embodiment, components the same as those in the first embodiment will be denoted by the same reference signs, and description thereof will be omitted.

A shape of a waveguide 20C of the optical device 107 is different from that of the waveguide 20 of the optical device 100. The optical device 107 does not include a monitoring waveguide 26. In the optical device 107, some of light output from an output end of an output waveguide 25 is applied to a magnetic element 30 as monitoring light.

Figure 22:
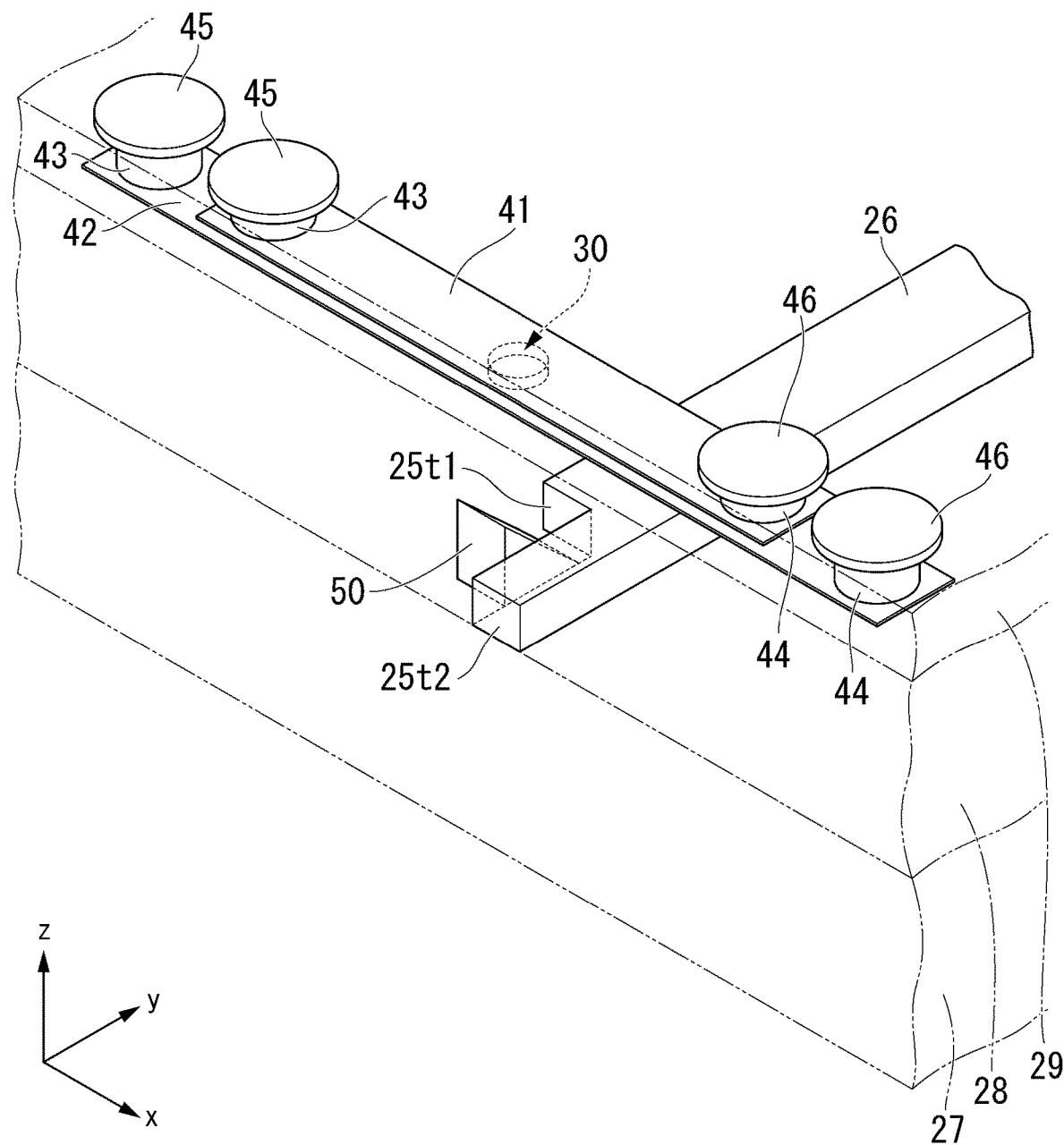
FIG. 22 is a perspective view of a first example in the vicinity of a magnetic element of the optical device according to the eighth embodiment.

FIG. 22 is a perspective view of a first example of the vicinity of the magnetic element 30 of the optical device 107 according to the eighth embodiment. In FIG. 22, the output waveguide 25 is divided into two output ends 25t1 and 25t2. The output end 25t1 is at a position different from the output end 25t2 in an x direction.

A reflector 50 is on a front side in a traveling direction of light from the output end 25t1. Light reflected by the reflector 50 is applied to the magnetic element 30 as the monitoring light. That is, some of the light output from the output end of the output waveguide 25 is applied to the magnetic element 30 as the monitoring light. The output end 25t2 is exposed to the outside. Output light $L_{out}$ is output from the output end 25t2.

Figure 23:
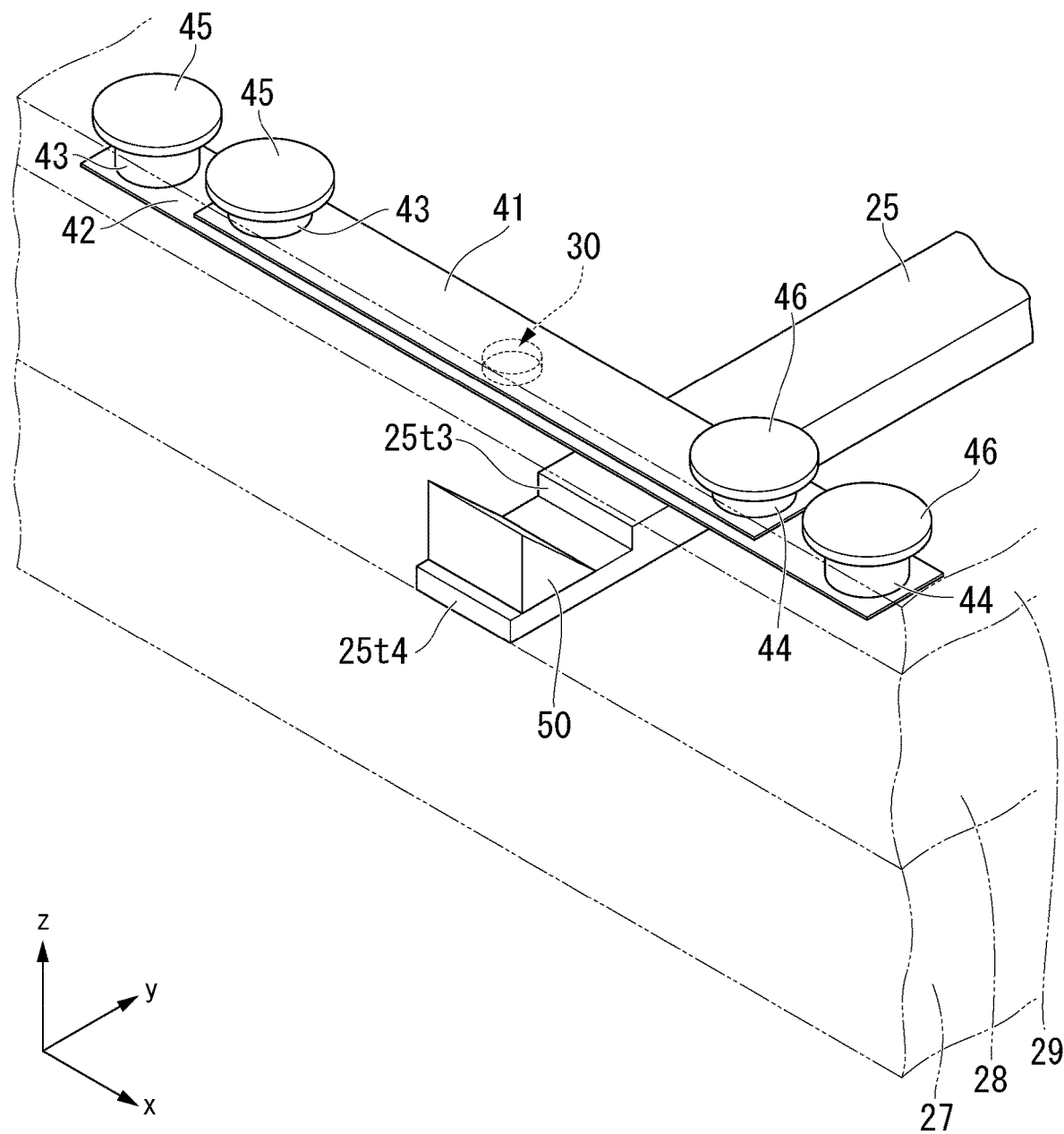
FIG. 23 is a perspective view of a second example in the vicinity of the magnetic element of the optical device according to the eighth embodiment.

FIG. 23 is a perspective view of a second example of the vicinity of the magnetic element 30 of the optical device 107 according to the eighth embodiment. In FIG. 23, the output waveguide 25 is divided into two output ends 25t3 and 25t4. The output end 25t3 is at a position different from the output end 25t4 in the z direction.

The reflector 50 is on a front side in a traveling direction of light from the output end 25t3. The light reflected by the reflector 50 is applied to the magnetic element 30 as monitoring light. That is, some of the light output from the output end of the output waveguide 25 is applied to the magnetic element 30 as the monitoring light. The output end 25t4 is exposed to the outside. The output light $L_{out}$ is output from the output end 25t4.

The optical device 107 according to the eighth embodiment achieves the same effects as in the optical device 100.

Ninth Embodiment

Figure 24:
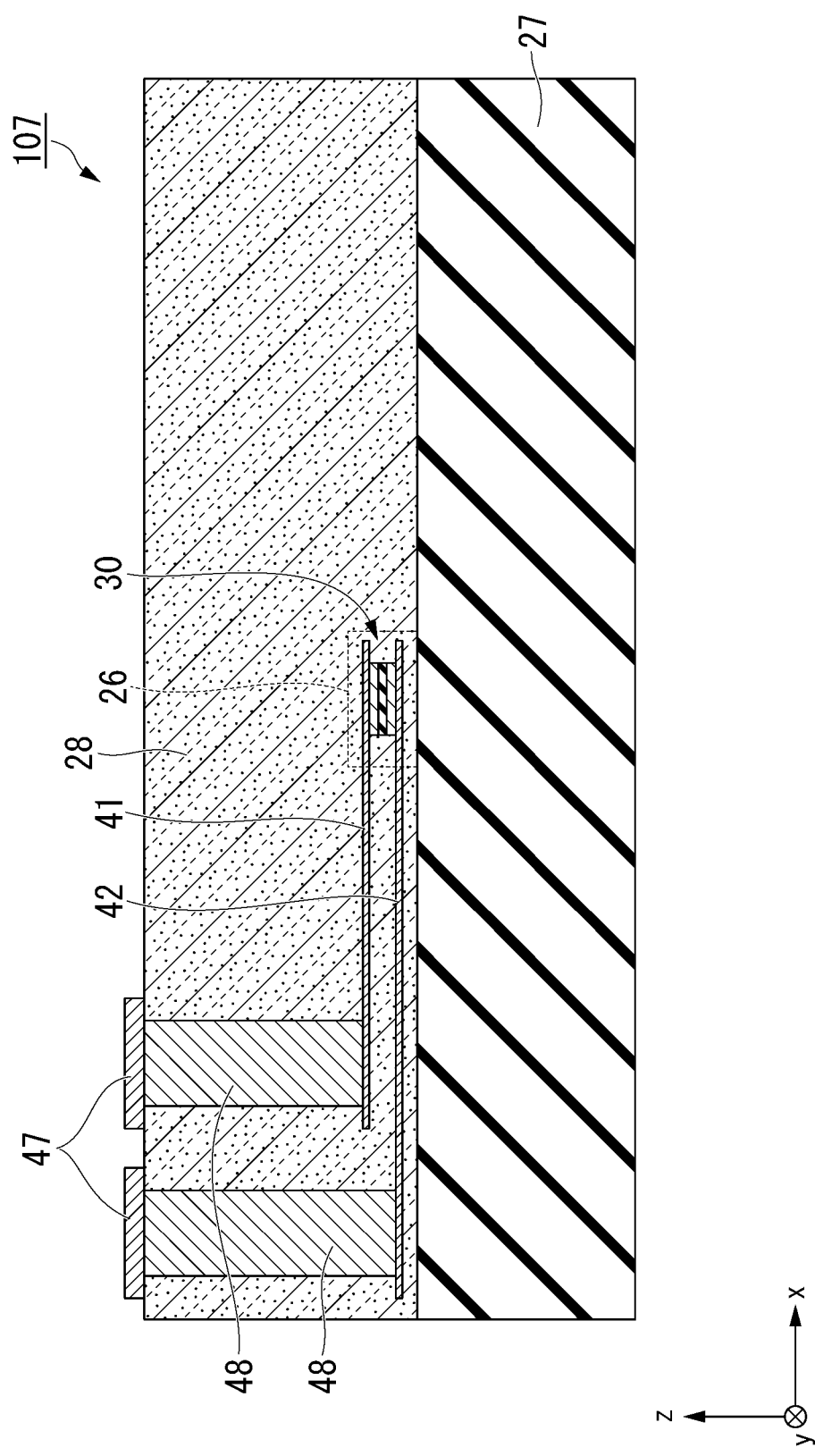
FIG. 24 is a cross-sectional view in the vicinity of a magnetic element of an optical device according to a ninth embodiment.

FIG. 24 is a cross-sectional view in the vicinity of a magnetic element 30 of an optical device 108 according to a ninth embodiment. In the ninth embodiment, components the same as those in the first embodiment will be denoted by the same reference signs, and description thereof will be omitted.

The magnetic element 30 is electrically connected to, for example, electrodes 41 and 42, a via wiring 48, and an input/output terminal 47. In the optical device 108 according to the ninth embodiment, an input terminal and an output terminal are common for the magnetic element 30.

The via wiring 48 connects the input/output terminal 47 to the electrode 41 or the electrode 42. There are, for example, two input/output terminals 47. A current or a voltage is input to one of the input/output terminals 47, and a signal is output from one of the input/output terminals 47. The other of the input/output terminals 47 is connected to a reference electric potential.

The optical device 108 according to the ninth embodiment achieves the same effects as in the optical device 100.

Tenth Embodiment

Figure 25:
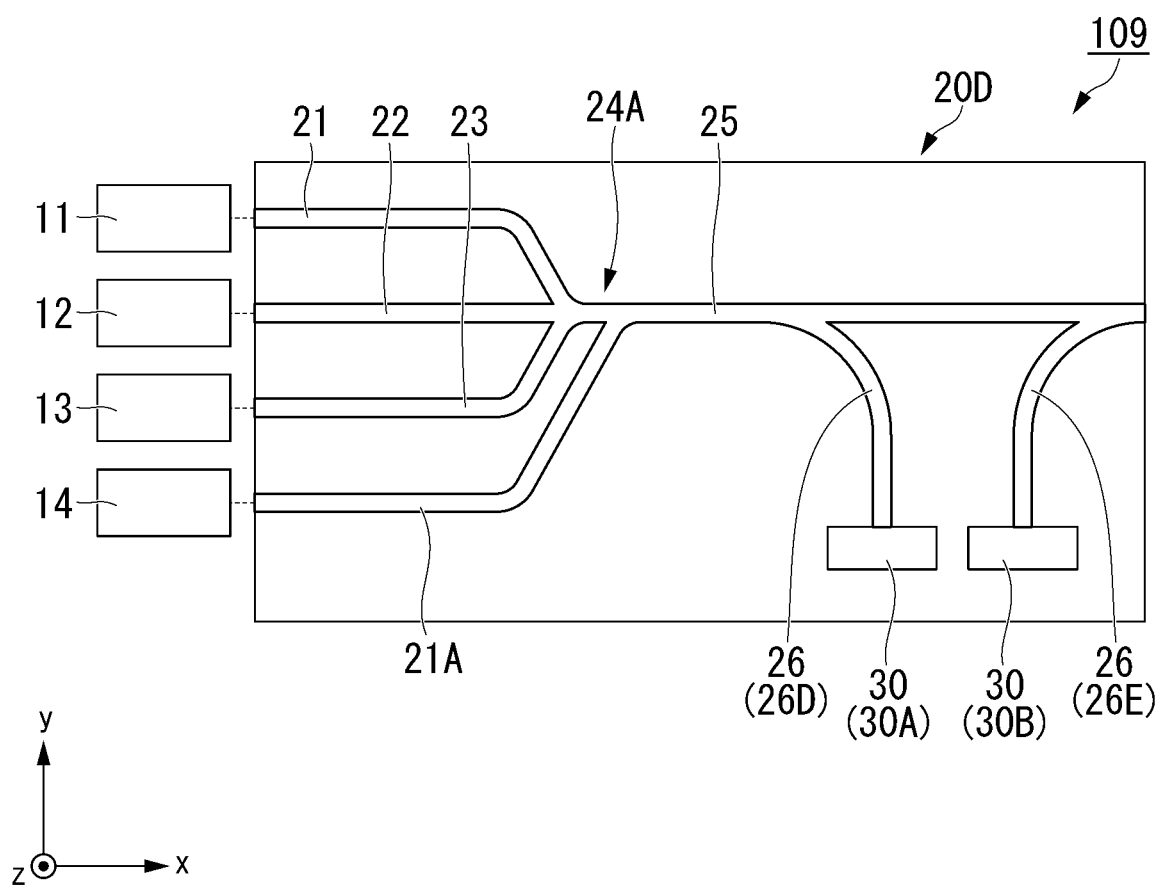
FIG. 25 is a plan view of an optical device according to a tenth embodiment.

FIG. 25 is a plan view of an optical device 109 according to a tenth embodiment from a z direction. In the tenth embodiment, components the same as those in the first embodiment will be denoted by the same reference signs, and description thereof will be omitted.

The optical device 109 includes a plurality of laser diodes 11, 12, 13, and 14, a waveguide 20D, and a plurality of magnetic elements 30.

The laser diode 14 outputs laser light. For example, the laser diode 14 is a near-infrared laser that outputs light (near infrared rays) in a wavelength region of 780 nm or more and 2500 nm or less.

A shape of the waveguide 20D of the optical device 109 is different from that of the waveguide 20 of the optical device 100. The optical device 109 includes input waveguides 21, 22, 23, and 21A, a combined waveguide 24A, an output waveguide 25, and monitoring waveguides 26D and 26E.

The input waveguide 21A is optically connected to the laser diode 14. For example, light output from the laser diode 14 propagate in the input waveguide 21A. The combined waveguide 24A is between the input waveguides 21, 22, 23, and 21A and the output waveguide 25. Light propagating in each of the input waveguides 21, 22, 23, and 21A is combined at the combined waveguide 24A. The output waveguide 25 is connected to the combined waveguide 24A. The output waveguide 25 is connected to the input waveguides 21, 22, 23, and 21A via the combined waveguide 24A, and the light from the input waveguides 21, 22, 23, and 21A propagate in the output waveguide 25.

The monitoring waveguides 26D and 26E are each connected to the output waveguide 25. A plurality of monitoring waveguides 26D may be provided, and the monitoring waveguides 26D may be connected to the respective input waveguides 21, 22, 23, and 21A as in the sixth embodiment. At least some of the light propagating in at least one of the input waveguides 21, 22, 23, and 21A and the output waveguide 25 propagate in the monitoring waveguide 26D. At least some of the light propagating in the output waveguide 25 propagate in the monitoring waveguide 26E.

At a connection part between the first monitoring waveguide 26D and the output waveguide 25, an angle formed by the first monitoring waveguide 26D with respect to a +x direction is, for example, smaller than 90°. At a connection part between the second monitoring waveguide 26E and the output waveguide 25, an angle formed by the second monitoring waveguide 26E with respect to the +x direction is, for example, larger than 90°. In the output waveguide 25, the +x direction is, for example, a direction in which the light output from the laser diodes 11, 12, 13, and 14 is directed toward an output end of the output waveguide 25.

Monitoring light propagate in the first monitoring waveguide 26D and the second monitoring waveguide 26E. At least some of the light output from the laser diodes 11, 12, 13, and 14 and propagating in at least one of the input waveguides 21, 22, 23, and 21A and the output waveguide 25 in a direction from the laser diodes 11, 12, 13, and 14 toward the input waveguides 21, 22, 23, and 21A or the output waveguide 25 propagate in the first monitoring waveguide 26D. At least some of the light output from the output waveguide 25 to the outside and reflected by an object to be irradiated propagate in the second monitoring waveguide 26E. Hereinafter, of the monitoring light, at least some of the light output from the laser diodes 11, 12, 13, and 14 and propagating in at least one of the input waveguides 21, 22, 23, and 21A and the output waveguide 25 in a direction from the laser diodes 11, 12, 13, and 14 toward the input waveguides 21, 22, 23, and 21A or the output waveguide 25 may be referred to as a first monitoring light, and at least some of the light output from the output waveguide 25 to the outside and reflected by an object to be irradiated may be referred to as a second monitoring light.

Each of the magnetic elements 30 is the above-described magnetic element 30. One of the magnetic elements 30 is referred to as a first magnetic element 30A, and the other one is referred to as a second magnetic element 30B. The first magnetic element 30A is at a position irradiated with the first monitoring light. The first magnetic element 30A is on a front side of an output end of the first monitoring waveguide 26D. The second magnetic element 30B is at a position irradiated with the second monitoring light. The second magnetic element 30B is on a front side of an output end of the second monitoring waveguide 26E. The first magnetic element 30A is irradiated with the first monitoring light, and the second magnetic element 30B is irradiated with the second monitoring light.

The optical device 109 according to the tenth embodiment achieves the same effects as in the optical device 100 of the first embodiment. Also, the optical device 109 can measure change in a state of an object to be irradiated by measuring an intensity of the reflected light from the object to be irradiated by using the second magnetic element 30B.

Figure 26:
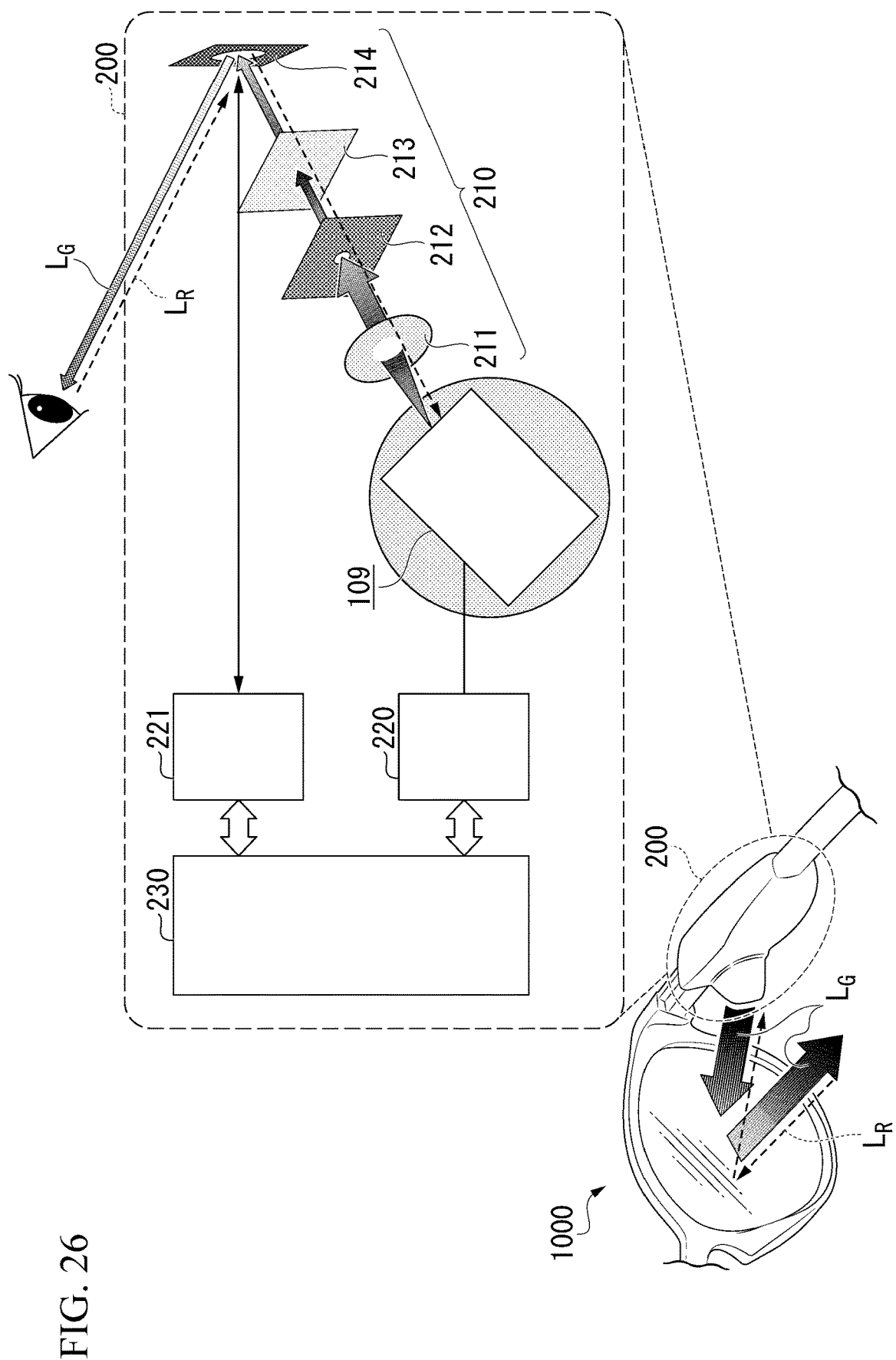
FIG. 26 is a conceptual view of an optical system using an optical device.

FIG. 26 is a conceptual view of an optical system 200 using the optical device 109. The optical system 200 can be mounted on, for example, glasses 1000.

The optical system 200 includes the optical device 109, an optics system 210, a driver 220 and 221, and a controller 230. The optics system 210 includes, for example, a collimator lens 211, a slit 212, an ND filter 213, and an optical scanning mirror 214. The optics system 210 guides light output from the optical device 109 to an object to be irradiated (eyes in this example). The optical scanning mirror 214 is, for example, a biaxial MEMS mirror that changes a reflection direction of laser light in a horizontal direction and a vertical direction. The optics system 210 is an example and is not limited to this example. The driver 220 controls outputs of the laser diodes 11, 12, 13, and 14. The driver 221 is a control system that moves the optical scanning mirror 214. The controller 230 controls the drivers 220 and 221.

Light $L_G$ output from the laser diodes 11, 12, 13, and 14 of the optical device 109 propagate in the optics system 210, is reflected by a lens of the glasses 1000, and is incident on the eyes. Here, an example in which light is reflected by the lens of the glasses 1000 is illustrated, but the eyes may be directly irradiated with the light.

The red, green, and blue light $L_G$ respectively emitted from the laser diodes 11, 12, and 13 displays an image. The image can be freely controlled by adjusting output intensities of the laser diodes 11, 12, and 13. The output intensity of each of the laser diodes 11, 12, and 13 can be adjusted on the basis of a measurement result of an output from the first magnetic element 30A irradiated with visible light output from each of the laser diodes 11, 12, and 13. Also, the outputs of the laser diodes 11, 12, and 13 may be kept constant, and an intensity of light reaching the combined waveguide 24A may be adjusted using a light modulation element.

Figure 27:
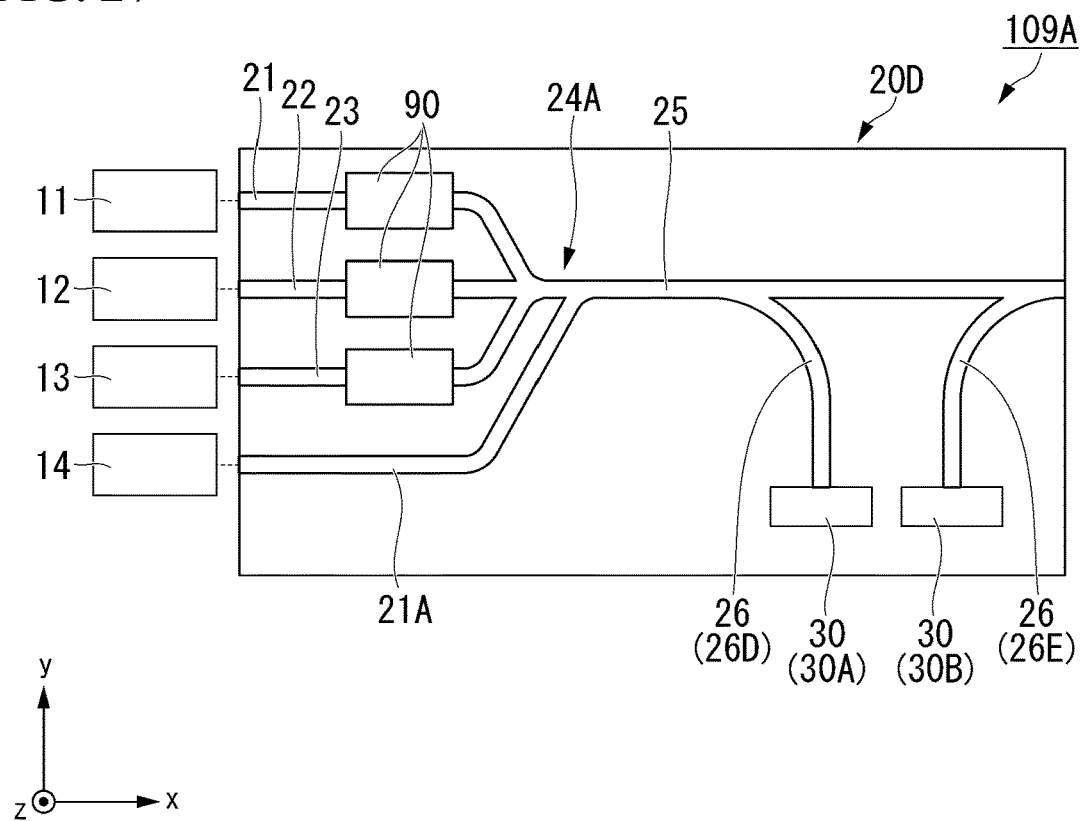
FIG. 27 is a plan view of an optical device according to a modified example of the tenth embodiment.

FIG. 27 is a plan view of an optical device according to a modified example from the z direction. In an optical device 109A, each of the input waveguides 21, 22, and 23 includes a light modulation element 90.

Figure 28:
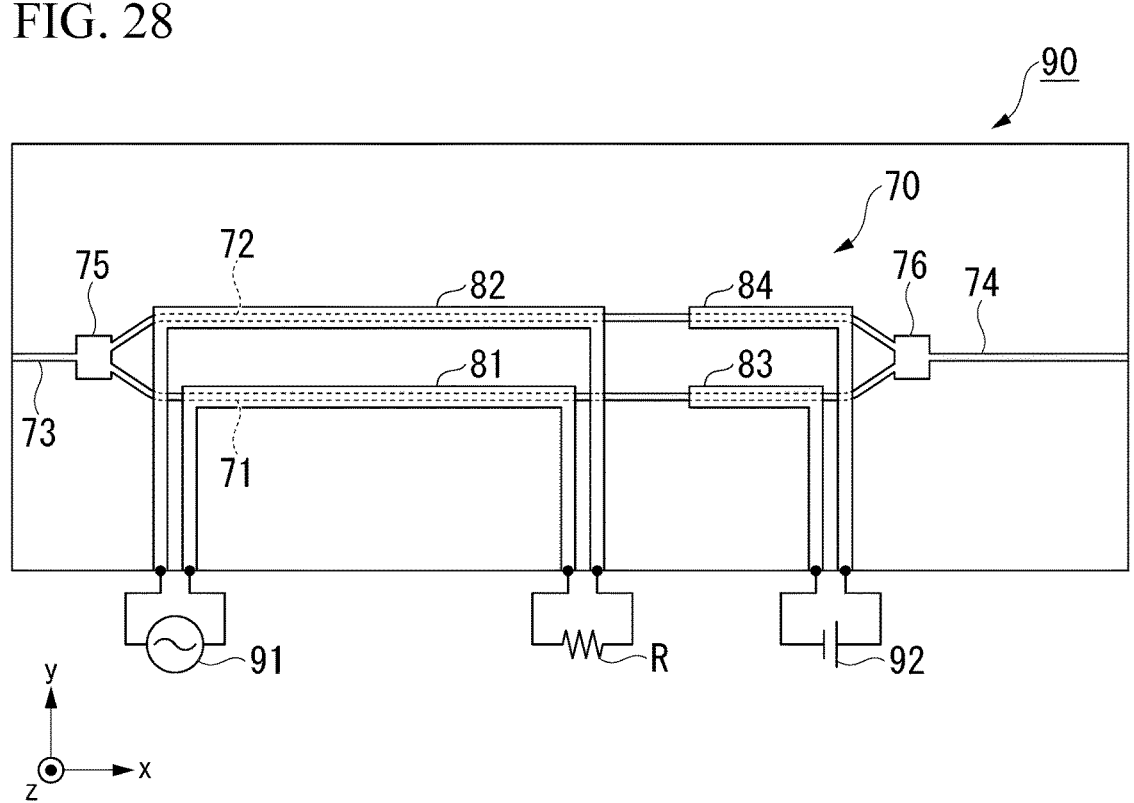
FIG. 28 is a plan view of a light modulation element.

FIG. 28 is a plan view of the light modulation element 90. FIG. 28 illustrates power supplies 91 and 92 and a terminating resistor R together. The light modulation element 90 includes a waveguide 70 and electrodes 81, 82, 83, and 84. The light modulation element 90 illustrated in FIG. 28 is an example of the light modulation element and is not limited to this example.

Input light input from a waveguide 73 branches to a first waveguide 71 and a second waveguide 72 at a branch part 75 and propagates. A phase difference between the light propagating in the first waveguide 71 and the light propagating in the second waveguide 72 is zero at the time of branching.

When a voltage is applied between the electrode 81 and the electrode 82, an electric field is applied to the first waveguide 71 and the second waveguide 72, and refractive indexes of the first waveguide 71 and the second waveguide 72 change due to the electro-optic effect. When the refractive indexes of the first waveguide 71 and the second waveguide 72 are different, a phase difference occurs between the light propagating in the first waveguide 71 and the light propagating in the second waveguide 72. The light propagating in the first waveguide 71 and the second waveguide 72 is combined at a coupling part 76 to be output from a waveguide 74.

Output light is superposition of the light propagating in the first waveguide 71 and the light propagating in the second waveguide 72. An intensity of the output light changes according to a phase difference between the light propagating in the first waveguide 71 and the light propagating in the second waveguide 72. For example, when the phase difference is an even multiple of it, the light intensifies each other, and when the phase difference is an odd multiple of π, the light weakens each other. In this way, when the light modulation element 90 is used, the intensity of the light reaching the combined waveguide 74 can also be adjusted while keeping the outputs of the laser diodes 11, 12, and 13 constant. The configuration in which an intensity of light is adjusted using the light modulation element 90 can reduce power consumption compared to a configuration in which the outputs of the laser diodes 11, 12, and 13 are directly adjusted. The configuration in which the light modulation element 90 is applied to the input waveguides 21, 22 and 23 is also applicable to the optical devices according to the first to ninth embodiments.

In the light modulation element 90, the waveguide 70 may further include a monitoring waveguide connected to the waveguide 74 and a magnetic element on a front side of an output end of the monitoring waveguide. This magnetic element is the same as the magnetic element 30 described above. When the magnetic element 30 is used, an intensity of the light propagating in the waveguide 74 can be monitored.

Near-infrared rays emitted from the laser diode 14 of the optical device 109 are reflected by a pupil of an eye. Reflected light $L_R$ reflected by the pupil of the eye passes through the same optical axis as the light $L_G$, and reaches the optical device 109. In the optical device 109, at least some of the reflected light $L_R$, which is near-infrared rays, propagate in the second monitoring waveguide 26E from the output end of the output waveguide 25 and is applied to the second magnetic element 30B. The second magnetic element 30B measures an intensity of the reflected light Lu. The optical system 200 can identify an irradiation position of the near-infrared rays adjusted by the optical scanning mirror 214 and movement of a point of line-of-sight (point of gaze) from the intensity of the reflected light Lu. The reflected light $L_R$ is not limited to light reflected by a pupil of the eye, and may be light reflected by a cornea of the eye or light reflected by a sclera of the eye.

Here, as an example of the optical system, a system capable of performing both image display and eye tracking has been exemplified, but the present disclosure is not limited to this example.

For example, the laser diode 14 for eye tracking may be removed from the above-described optical system. In this case, the optical system is a system for displaying images. In this case, the optical devices 100 to 108 according to the first to ninth embodiments can be used instead of the optical device 109.

Figure 29:
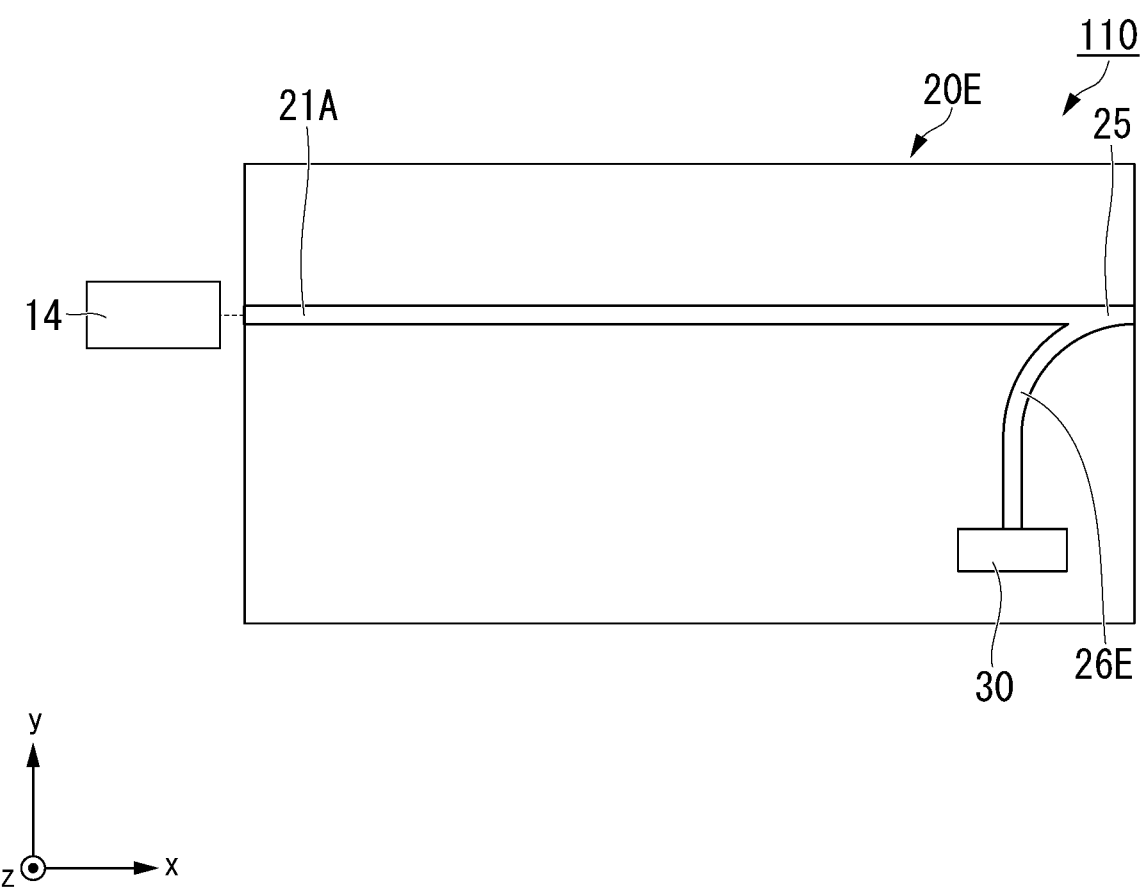
FIG. 29 is a plan view of an example of an optical device that can be used in a dedicated system for eye tracking.

Also, for example, the laser diodes 11, 12, and 13 for displaying images may be removed from the above-described optical system. In this case, the optical system is a dedicated system for eye tracking. FIG. 29 is a plan view illustrating an example of an optical device 110 that can be used in a dedicated system for eye tracking. The optical device 110 includes the laser diode 14, an optical waveguide 20E, and the magnetic element 30. The optical waveguide 20E includes the input waveguide 21A, the output waveguide 25, and the second monitoring waveguide 26E. At least some of light propagating in the output waveguide 25 is applied to the magnetic element 30 via the second monitoring waveguide 26E. At least some of the light output from the output waveguide 25 to the outside and reflected by an object to be irradiated is applied to the magnetic element 30 via the second monitoring waveguide 26E.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims. For example, characteristic configurations in the above-described embodiments and modified examples may be combined.

What is claimed is:

1. An optical device comprising:
   at least one magnetic element including a first ferromagnetic layer, a second ferromagnetic layer, and a spacer layer sandwiched between the first ferromagnetic layer and the second ferromagnetic layer;
   a laser diode; and
   a waveguide, wherein
   the waveguide includes at least one input waveguide optically connected to the laser diode and an output waveguide connected to the input waveguide,
   at least some of light propagating in at least one of the input waveguide and the output waveguide is applied to the magnetic element, and
   at least part of the waveguide is between the laser diode and the magnetic element along a direction of propagation of light emitted from the laser diode.

2. The optical device according to claim 1, wherein the waveguide contains lithium niobate as a main component.

3. The optical device according to claim 1, further comprising a substrate, wherein
   the waveguide is formed on the substrate, and
   the substrate contains aluminum oxide.

4. The optical device according to claim 1, further comprising a substrate, wherein
   the waveguide is formed on the substrate, and
   the magnetic element is on or above the substrate.

5. The optical device according to claim 1, further comprising a reflector, wherein the reflector reflects at least some of the light propagating in at least one of the input waveguide and the output waveguide toward the magnetic element.

6. The optical device according to claim 1, wherein at least some of the light propagating in at least one of the input waveguide and the output waveguide is applied to the magnetic element from a direction intersecting a lamination direction of the magnetic element.

7. The optical device according to claim 1, wherein at least some of the light propagating in at least one of the input waveguide and the output waveguide is applied to the magnetic element from a lamination direction of the magnetic element.

8. The optical device according to claim 1, further comprising a support body which is different from a substrate on which the waveguide is formed and supports the magnetic element.

9. The optical device according to claim 1, wherein the waveguide further includes a monitoring waveguide, the monitoring waveguide is connected to at least one of the input waveguide and the output waveguide, and at least some of the light propagating in at least one of the input waveguide and the output waveguide propagate in the monitoring waveguide.

10. The optical device according to claim 1, wherein the at least one input waveguide comprises a plurality of input waveguides, the at least one magnetic element comprises a plurality of magnetic elements and monitoring waveguides connected to the respective input waveguides are further provided, and light propagating in the monitoring waveguides is applied to the respective magnetic elements.

11. An optical device comprising:

a plurality of magnetic elements each including a first ferromagnetic layer, a second ferromagnetic layer, and a spacer layer sandwiched between the first ferromagnetic layer and the second ferromagnetic layer;

a laser diode; and a waveguide, wherein the waveguide includes at least one input waveguide optically connected to the laser diode and an output waveguide connected to the input waveguide, at least some of light propagating in at least one of the input waveguide and the output waveguide in a direction from the laser diode toward the input waveguide or the output waveguide is applied to a first magnetic element of the magnetic elements, and at least some of light output from the output waveguide and reflected by an object to be irradiated is applied to a second magnetic element of the magnetic elements.

12. An optical system comprising:

the optical device according to claim 11; and an optics system which guides light output from the optical device to an object to be irradiated.

* * * * *